US010101448B2

(12) United States Patent
Hamada et al.

(10) Patent No.: US 10,101,448 B2
(45) Date of Patent: Oct. 16, 2018

(54) ON-BOARD RADAR APPARATUS AND REGION DETECTION METHOD

(71) Applicant: Panasonic Intellectual Property Management Co., Ltd., Osaka (JP)

(72) Inventors: Asako Hamada, Kanagawa (JP); Hirofumi Nishimura, Kanagawa (JP); Kiyotaka Kobayashi, Kanagawa (JP); Maiko Shikatani, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 420 days.

(21) Appl. No.: 14/951,481

(22) Filed: Nov. 24, 2015

(65) Prior Publication Data
US 2016/0170020 A1 Jun. 16, 2016

(30) Foreign Application Priority Data

Dec. 12, 2014 (JP) ................................. 2014-251876
Jul. 1, 2015 (JP) ................................. 2015-132621
Oct. 6, 2015 (JP) ................................. 2015-198675

(51) Int. Cl.
*G01S 13/93* (2006.01)
*G01S 13/66* (2006.01)
(Continued)

(52) U.S. Cl.
CPC ............ *G01S 13/931* (2013.01); *G01S 7/414* (2013.01); *G01S 13/66* (2013.01); *G01S 13/723* (2013.01); *G01S 13/867* (2013.01)

(58) Field of Classification Search
CPC ..................................................... G01S 7/414
(Continued)

(56) References Cited

U.S. PATENT DOCUMENTS 6,198,426 B1 * 3/2001 Tamatsu ................ G01S 13/931
342/114
6,542,111 B1 * 4/2003 Wilson ...................... B60T 7/22
180/168
(Continued)

FOREIGN PATENT DOCUMENTS

JP 2010-266225 11/2010
JP 5206579 B2 6/2013

OTHER PUBLICATIONS

Extended European Search Report, dated May 12, 2016, for corresponding EP Application No. 15196636.3-1812, 9 pAGES.

*Primary Examiner* — Peter M Bythrow
*Assistant Examiner* — Helena H Seraydaryan
(74) *Attorney, Agent, or Firm* — Seed IP Law Group LLP

(57) ABSTRACT

An on-board radar apparatus includes a transmitter/receiver that transmits a radar signal to a detection range for every frame and receives one or more reflected signals which are the radar signal reflected by one or more objects; a detector that detects, for every frame in each direction within the detection range, a position of a reflection point closest to the on-board radar apparatus as a boundary candidate position, which serves as a boundary with a region where no object exists within the detection range, among one or more reflection points detected on the basis of the one or more reflected signals; a calculator that calculates movement amount concerning an amount of movement of the on-board radar apparatus; an estimator that generates, for every frame in each direction within the detection range, an estimated boundary position by converting the boundary candidate position detected in a past frame into a boundary position in a current frame on the basis of the movement amount; and a smoother that performs, for every frame in each direction within the detection range, smoothing processing by using the boundary candidate position in the current frame and the (Continued)

estimated boundary position to calculate a boundary position with the region where no object exists within the detection range and outputs the calculated the boundary position to a driving support apparatus.

10 Claims, 19 Drawing Sheets

(51) Int. Cl.
    *G01S 7/41*         (2006.01)
    *G01S 13/72*       (2006.01)
    *G01S 13/86*       (2006.01)

(58) Field of Classification Search
    USPC .......................................................... 342/70
    See application file for complete search history.

(56) References Cited

U.S. PATENT DOCUMENTS

| | | |
|---|---|---|
| 2005/0122251 A1 | 6/2005 | Shimomura |
| 2010/0007728 A1* | 1/2010 | Strauss ............... B60R 21/0134 |
| | | 348/118 |

* cited by examiner

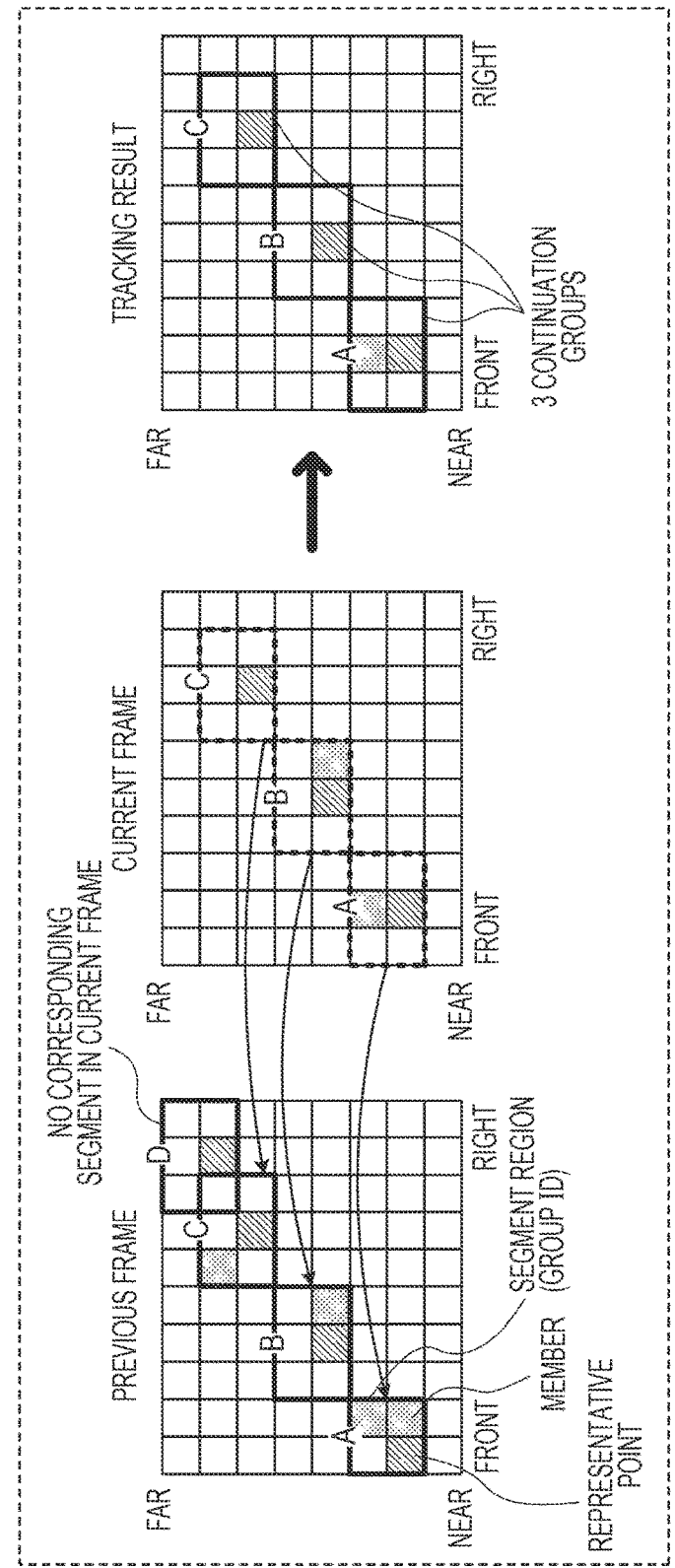

FIG. 7A

| TARGET DIRECTION | TARGET BOUNDARY INFORMATION | | | | |
|---|---|---|---|---|---|
| | ESTIMATED BOUNDARY INFORMATION [DISTANCE] | | | | BOUNDARY CANDIDATE INFORMATION [DISTANCE] |
| | FOUR FRAMES BEFORE | THREE FRAMES BEFORE | TWO FRAMES BEFORE | ONE FRAME BEFORE | CURRENT FRAME |
| θ − 2 | INDETERMINATE | INDETERMINATE | 60 | INDETERMINATE | 55 |
| θ − 1 | 90 | INDETERMINATE | 60 | INDETERMINATE | NO |
| DIRECTION OF INTEREST θ | INDETERMINATE | 50 | INDETERMINATE | 52 | 150 |
| θ + 1 | INDETERMINATE | INDETERMINATE | 30 | INDETERMINATE | 66 |
| θ + 2 | INDETERMINATE | 20 | INDETERMINATE | 48 | NO |

FIG. 7B

EFFECTIVE POSITION LIST

| 60 |
| 55 |
| 90 |
| 60 |
| 50 |
| 52 |
| 150 |
| 30 |
| 66 |
| 20 |
| 48 |

FIG. 7C

EFFECTIVE POSITION LIST AFTER SORTING

| 20 |
| 30 |
| 48 |
| 50 |
| 52 |
| 55 | ← MEDIAN VALUE
| 60 |
| 60 |
| 66 |
| 90 |
| 150 |

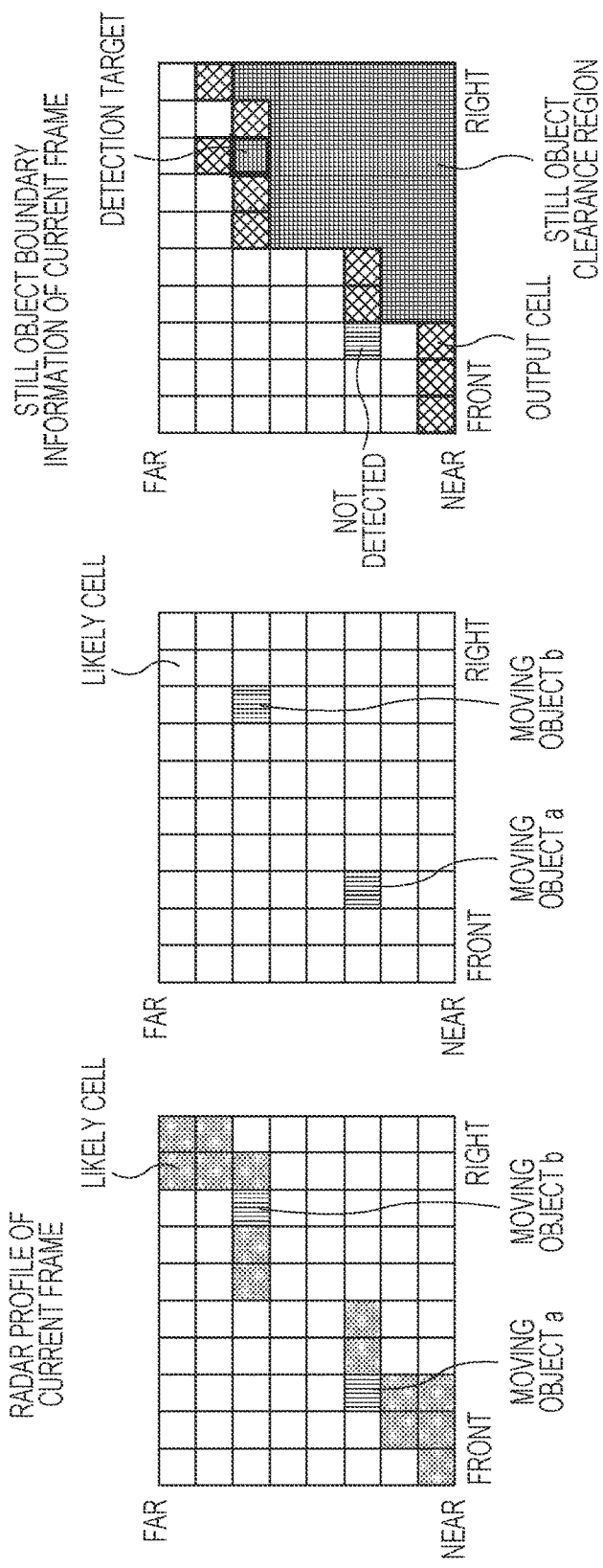

ON-BOARD RADAR APPARATUS AND REGION DETECTION METHOD

BACKGROUND

1. Technical Field

The present disclosure relates to an on-board radar apparatus and a region detection method.

2. Description of the Related Art

In recent years, a collision prevention system for preventing collision with an object (e.g., a vehicle or a pedestrian) by detecting an object around a vehicle on the basis of a received signal reflected by the object with the use of a radar (e.g., a millimeter-wave radar) has been developed.

Japanese Patent No. 5206579 discloses a method in which a radar apparatus mounted in a vehicle detects reflection points around the vehicle and groups predetermined ranges (segments) including the reflection points as a single object. The radar apparatus tracks the grouped segments over a plurality of frames.

However, in a case where targets to be detected by the conventional radar apparatus include a pedestrian or a roadside object, which is a weakly reflecting object, in addition to a vehicle, which is a strongly reflecting object, it is difficult for the conventional radar apparatus to distinguish an unnecessary wave (e.g., ground clutter) and a reflecting object. In the conventional radar apparatus, a power threshold value level used for detection of reflection points need be set high in order to remove an unnecessary wave. However, a signal reflected by a weakly reflecting object is, for example, susceptible to the influence of phasing, and therefore the power level of the reflected signal received by a radar apparatus is unstable.

Since the power threshold value level is set high in the conventional radar apparatus, it becomes more likely that the reception power of a signal reflected by a weak reflecting object which is a target to be detected is equal to or lower than the threshold value. Accordingly, the accuracy of detection of reflection points deteriorates.

In a case where a method of grouping reflection points for each object is used in the radar apparatus disclosed in Japanese Patent No. 5206579 that does not consider a signal reflected by a weakly reflecting object, processing for detecting objects including a weakly reflecting object is unstable. This problem need be dealt with.

Furthermore, targets to be detected by the radar apparatus disclosed in Japanese Patent No. 5206579 are objects whose sizes can be defined to some extent such as a vehicle. Therefore, in a case where grouping processing and tracking processing are performed on a roadside object, whose size or distinction is hard to define, by using size information in the radar apparatus disclosed in Japanese Patent No. 5206579, identification of an identical object between frames is unstable. This problem need be dealt with.

SUMMARY

One non-limiting and exemplary embodiment provides an on-board radar apparatus that can stably track an object.

In one general aspect, the techniques disclosed here feature an on-board radar apparatus comprising: a transmitter/receiver that transmits a radar signal to a detection range every frame and receives one or more reflected signals which are the radar signal reflected by one or more objects; a detector that detects, every frame in each direction within the detection range, a position of a reflection point closest to the on-board radar apparatus as a boundary candidate position, which serves as a boundary with a region where no object exists within the detection range, among one or more reflection points detected on the basis of the one or more reflected signals; a calculator that calculates movement amount concerning an amount of movement of the on-board radar apparatus; an estimator that generates, every frame in each direction within the detection range, an estimated boundary position by converting the boundary candidate position detected in a past frame into a boundary position in a current frame on the basis of the movement amount; and a smoother that performs, every frame in each direction within the detection range, smoothing processing by using the boundary candidate position in the current frame and the estimated boundary position to calculate a boundary position with the region where no object exists within the detection range and outputs the calculated the boundary position to a driving support apparatus.

According to one aspect of the present disclosure, smoothing processing for smoothing boundary candidate positions is used. It is therefore possible to stably track an object.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a diagram illustrating an example of operation of tracking an object over a plurality of frames;

FIG. 7A is a diagram illustrating a matrix of target direction × target boundary information;

FIG. 7B is a diagram illustrating an effective position list;

FIG. 7C is a diagram illustrating the effective position list after sorting;

FIG. 11A is a diagram illustrating a radar profile in the current frame;

FIG. 11B is a diagram illustrating a result of detection of a moving object;

FIG. 11C is a diagram illustrating still object boundary information in a previous frame;

DETAILED DESCRIPTION

Figure 1B:
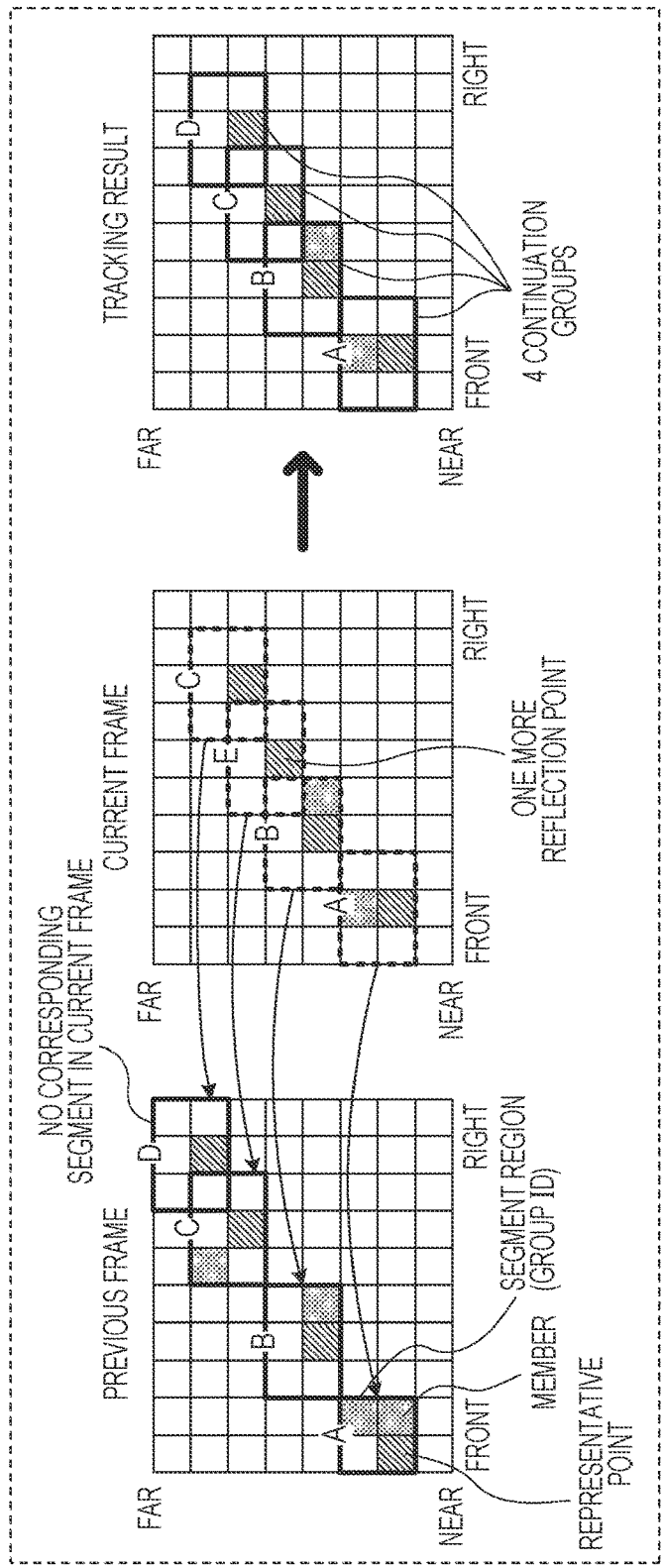
FIG. 1B is a diagram illustrating another example of operation of tracking an object over a plurality of frames.

Underlying Knowledge Forming Basis of One Aspect of Present Disclosure

FIG. 1A is a diagram illustrating an example of how the radar apparatus disclosed in Japanese Patent No. 5206579 detects an object (segment) and tracks the object over a plurality of frames. In FIG. 1A, the horizontal axis represents a direction (ranging from a front direction to a right-side direction in FIG. 1A) of measurement by the radar apparatus, and the vertical axis represents a distance from the radar apparatus. In each square (hereinafter referred to as "cell"), a reflection intensity (power) at a position of corresponding direction and distance is shown.

In FIG. 1A, first, the radar apparatus determines, in each frame, cells of representative points from among reflection points on the basis of a predetermined condition. Next, the radar apparatus groups other reflection points included in a segment region set for each representative point as cells of members of the segment. Segments are given group IDs that are different from each other. That is, the radar apparatus detects, as a single object, a segment including a cell of a representative point and cells of members (not including cells of members in some cases).

In FIG. 1A, the radar apparatus tracks an object by assigning, in each frame, the same group ID to the same segment as the segment detected in the previous frame (association of segments). For example, the radar apparatus determines whether or not the same segment exists on the basis of the presence or absence of the representative point in a search range. In FIG. 1A, as a tracking result, the radar apparatus tracks, in a current frame, three segments A through C among four segments A through D detected in the previous frame (three continued groups).

Since a target to be monitored by the conventional radar apparatus is a vehicle, it is only necessary to extract a strongly reflected wave, and a reflected wave output position is sparse. Furthermore, in a case where a pedestrian is not included in targets to be monitored by the conventional radar apparatus, it is relatively easy to group, as a segment, waves reflected by a vehicle, for example, by using information on the size of the vehicle or information on a traffic lane.

In a case where a vehicle and a pedestrian are targets to be monitored by a radar apparatus, the importance of monitoring of a pedestrian varies depending on a situation around the pedestrian such as the presence or absence of an obstacle (e.g., shrubbery or a guardrail) between the vehicle and the pedestrian. Therefore, in a case where a pedestrian is included in targets to be monitored, it is also necessary to detect a roadside object.

In a case where a target to be monitored by the conventional radar apparatus is a pedestrian or a roadside object, the following problems occur.

It is difficult for the conventional radar apparatus to distinguish a weakly reflected wave including a pedestrian or a roadside object from an unnecessary wave such as ground clutter. A threshold value for detection need be set low in order to detect all targets to be detected by a weakly reflected wave. Accordingly, the conventional radar apparatus also detects an unnecessary wave in addition to the desired targets to be detected. Detection of an unnecessary wave causes erroneous detection and puts a load on later-stage processing of the radar apparatus. This causes inconvenience such as a decline in performance of an application that receives a detection result of the radar apparatus. Since it is difficult to set the threshold value for detection excessively low, detection of a target to be detected by the conventional radar apparatus is unstable. For example, in the conventional radar apparatus, it is more likely that a case where a reflection point that was not detected in a previous frame is newly detected in a current frame (or an opposite case) occurs.

FIG. 1B illustrates another example of operation of tracking an object over a plurality of frames. For example, FIG. 1B illustrates a state where four segments A through D are detected in a previous frame, and in a current frame, three segments A through C are detected again among the four segments detected in the previous frame, the remaining segment D is out of the frame (no corresponding segment in the current frame), and one more segment E defined by a new representative point is detected.

In FIG. 1B, in tracking processing (association of segments) between the previous frame and the current frame, the conventional radar apparatus associates different segments as an identical segment (identical group ID) due to occurrence of the segment E.

In the current frame illustrated in FIG. 1B, the three segments A through C in the previous frame are tracked as the three segments A through C in the current frame, and the segment C in the previous frame is mistakenly associated with the segment E in the current frame instead of outputting the segment E in the current frame as a new segment, and the segment D in the previous frame is mistakenly associated with the segment C in the current frame. That is, the four segments A through D are output as a result of the tracking processing.

Since the accuracy of detection of an object by the conventional radar apparatus is insufficient, for example, erroneous assignment of a group ID and erroneous detection of a segment that has moved out of the frame occur during a period between the entry of an object into a detection range of the radar apparatus to the exit of the object from the detection range. Therefore, tracking of the object is unstable.

Furthermore, since a roadside object (e.g., shrubbery or a guardrail) is assumed to have various shapes and sizes, it is difficult to define a predetermined size as a region (segment region) unlike a vehicle.

According to the method used in Japanese Patent No. 5206579 in which reflection points are detected for each object by using sizes (segment regions) of objects to be detected that are accumulated in advance, many candidate segment regions exist in succession of a group ID of an object whose size is different from the accumulated sizes of objects. Therefore, erroneous succession (association) of a group ID is likely to occur, and the tracking processing is unstable.

One aspect according to the present disclosure is accomplished to solve the above problems, and an object of the aspect of the present disclosure is to improve the accuracy of detection of a reflecting object by a radar, thereby performing stable object tracking processing.

Embodiment 1

An embodiment of the present disclosure is described in detail below with reference to the drawings.

Configuration of Radar Apparatus 100

Figure 2B:
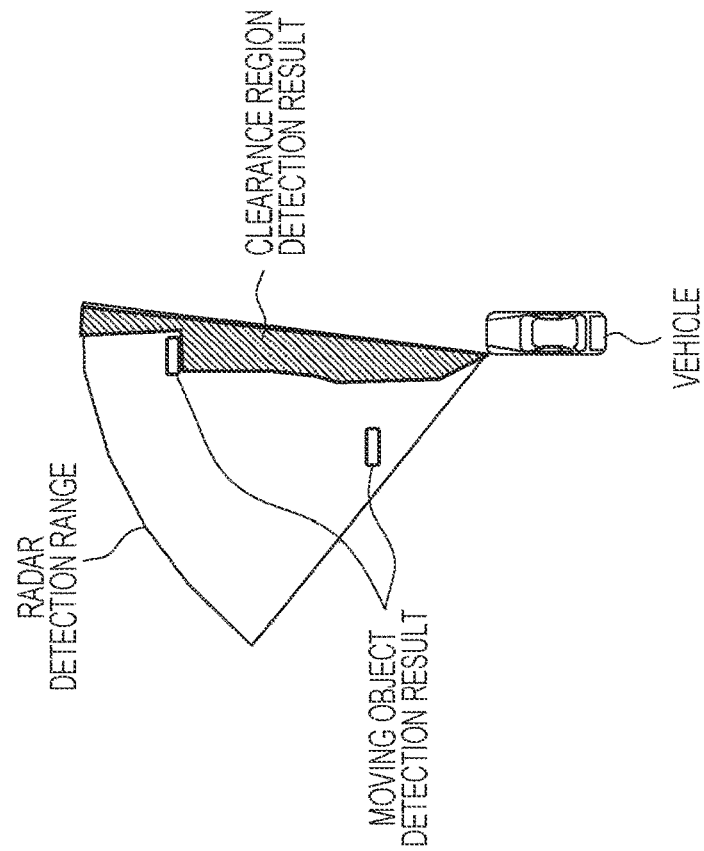
FIG. 2B is a diagram illustrating a clearance region.
Figure 2A:
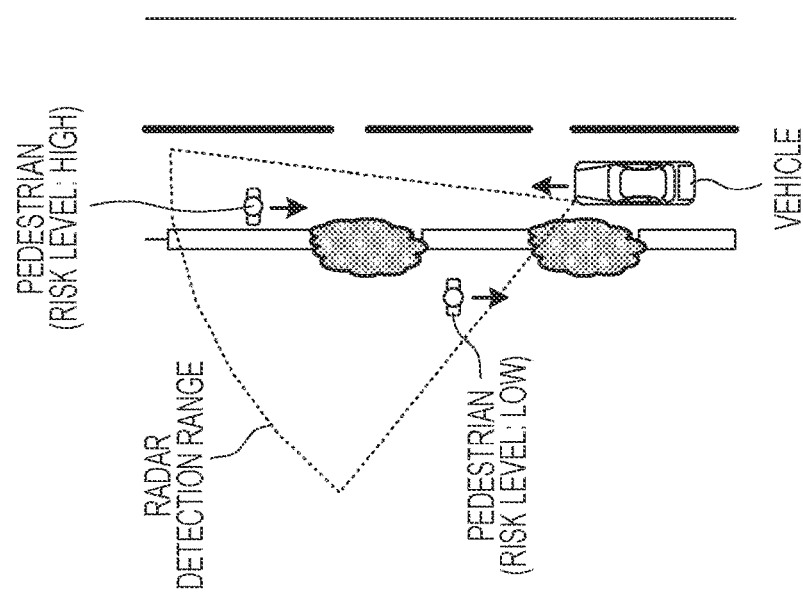
FIG. 2A is a diagram illustrating an object around a vehicle.

A radar apparatus 100 according to an embodiment of the present disclosure is mounted in a vehicle illustrated in FIG. 2A.

The radar apparatus 100 detects an object (another vehicle, a pedestrian, a roadside object) that exists around the vehicle (e.g., in front of the vehicle or diagonally in front of the vehicle) in which the radar apparatus 100 is mounted and determines a region around the vehicle (hereinafter referred to as a "clearance region") in which no object (i.e., obstacle) exists on the basis of the detected information (see, for example, FIG. 2B; details will be described later). Note that the roadside object encompasses, for example, a guardrail and a tree.

The radar apparatus 100 provides, for example, information on the determined clearance region, for example, to a collision prevention apparatus (not illustrated) which serves as a driving support apparatus. Note that the radar apparatus 100 may detect a moving object (e.g., a vehicle or a pedestrian) by using another method in addition to the clearance region (see FIG. 2B).

Figure 3:
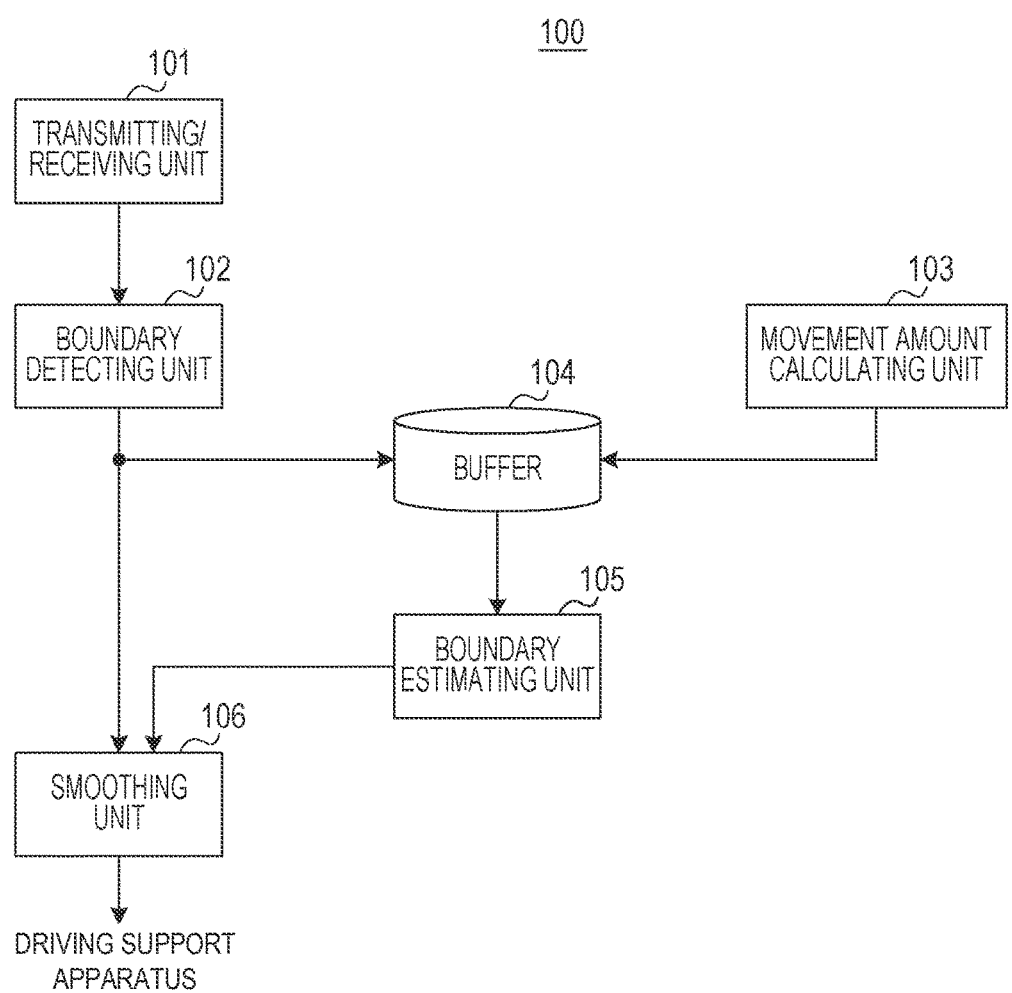
FIG. 3 is a diagram illustrating an example of a configuration of a radar apparatus according to Embodiment 1 of the present disclosure.

FIG. 3 is a block diagram illustrating an example of a configuration of the radar apparatus 100. The radar apparatus 100 illustrated in FIG. 3 includes a transmitting/receiving unit 101, a boundary detecting unit 102, a movement amount calculating unit 103, a buffer 104, a boundary estimating unit 105, and a smoothing unit 106.

The transmitting/receiving unit 101 transmits a radar signal generated by using a millimeter-wave radar toward a predetermined direction (at each predetermined angle) via a transmission antenna and receives, as a reflected signal, the radar signal reflected by each object that exists in each direction via a reception antenna. The transmitting/receiving unit 101 detects reflection points by using the reflected signal and generates reflection point information indicative of the detected reflection points. The reflection point information includes, for example, a distance, a direction, a relative speed, and a reflection intensity. The transmitting/receiving unit 101 supplies the reflection point information (hereinafter referred to as a radar profile) generated for each frame to the boundary detecting unit 102.

The boundary detecting unit 102 detects positions of reflection points (hereinafter referred to as boundary candidate positions) that serve as a boundary with a region around the vehicle (clearance region) where no object exists by using the reflection point information in each frame supplied from the transmitting/receiving unit 101.

In each frame, the boundary detecting unit 102 detects, in each direction within the detection range of the radar apparatus 100, a position of a reflection point closest to the radar apparatus 100 as a boundary candidate position in the direction among the reflection points indicated by the reflection point information. That is, the boundary detecting unit 102 detects a candidate of a boundary between the clearance region and a region where an object exists. For example, the boundary detecting unit 102 may detect a boundary candidate by interpolation processing. Specifically, in a case where it is determined, by using information on a plurality of peripheral cells around an evaluation target cell (a reflection point that is evaluated), that the percentage of peripheral cells whose power exceeds a power threshold value among the plurality of peripheral cells is equal to or larger than a certain value, the boundary detecting unit 102 may detect the evaluation target cell as a boundary candidate.

Note that the boundary candidate position need not be the closest reflection point and can be a reflection point obtained after averaging processing in a plurality of frames.

The boundary detecting unit 102 supplies boundary candidate information indicative of the detected boundary candidate position to the buffer 104 and the smoothing unit 106. Note that the boundary candidate information is, for example, expressed by a radar coordinate system of the transmitting/receiving unit 101.

The movement amount calculating unit 103 calculates movement data of the radar apparatus 100 (e.g., a moving speed of the radar apparatus 100 and a moving direction of the radar apparatus 100), for example, by using vehicle movement data (e.g., a vehicle speed and a direction) concerning the amount of movement of the vehicle calculated on the basis of information on the speed and rudder angle of the vehicle detected by a sensor (not illustrated) and installation information of the radar apparatus 100 mounted in the vehicle. The movement data of the radar apparatus 100 is, for example, calculated per frame. The movement amount calculating unit 103 supplies movement information including the movement data of the radar apparatus 100 and the vehicle movement data to the buffer 104.

Note that a method of calculating the vehicle movement data is not limited to the method using the speed and rudder angle of the vehicle. The vehicle movement data may be calculated by using information acquired by a gyro sensor or an acceleration sensor or may be calculated by specifying a reflected wave from a still object from among reflected waves from a peripheral region that are received by the radar apparatus 100 instead of using information acquired by a sensor on the basis of the description of International Publication NO. 2015/037173.

The buffer 104 stores therein the boundary candidate information supplied from the boundary detecting unit 102 and the movement information supplied from the movement amount calculating unit 103. Note that the number of past frames is not limited to one and can be more than one. In a case where a plurality of past frames are stored in the buffer 104, the past frames paired (associated) with corresponding movement information are stored in the buffer 104. The buffer 104 supplies the stored boundary candidate information of the past frame and movement information to the boundary estimating unit 105.

The boundary estimating unit 105 receives the boundary candidate information of the past frame and the movement information indicative of a state of movement of the vehicle from the past frame to the current frame. The boundary estimating unit 105 estimates, as an estimated boundary position, the position of a reflection point closest to the radar apparatus 100 in the current frame on the basis of the boundary candidate information of the past frame and the movement information.

Figure 4:
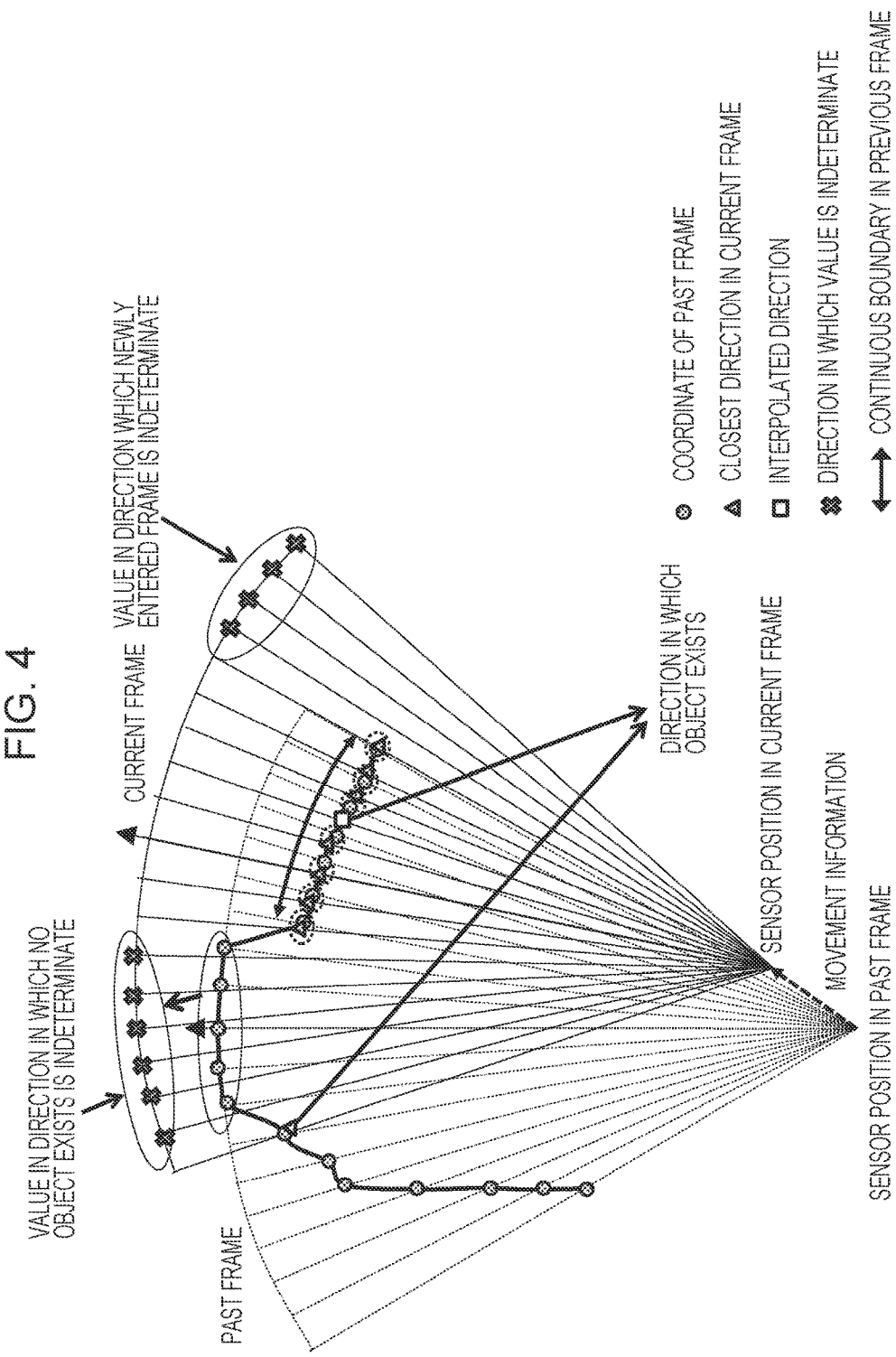
FIG. 4 is a diagram illustrating an example of boundary estimation processing according to Embodiment 1 of the present disclosure.

FIG. 4 illustrates an example of boundary estimation processing. The boundary estimating unit 105 calculates a position obtained after moving the boundary candidate position in the past frame in accordance with the movement information (e.g., the direction and the distance) of the radar apparatus 100 from the past frame to the current frame. Then, the boundary estimating unit 105 converts the calculated position into a position on the radar coordinate system of the current frame and sets the position obtained by conversion as an estimated boundary position (indicated by the white triangle in FIG. 4) of the current frame.

Note that in a case where boundary candidate positions are continuously output in the past frame and where the continuity is lost in a direction (indicated by the white rectangle in FIG. 4) after conversion into the current frame, the boundary estimating unit 105 performs, for example, interpolation processing by using a linear interpolation method so that continuous boundary positions are also output in the current frame. For example, the average of distances in both left adjacent direction and right adjacent direction are used.

Furthermore, after conversion into the current frame, the boundary estimating unit 105 gives, for example, information of "value indeterminate" to a direction (indicated by the cross in FIG. 4) in which no boundary position exists in the past frame. Similarly, the boundary estimating unit 105 gives, for example, information of "value indeterminate" to a direction (indicated by the cross in FIG. 4) that has newly entered the frame on the basis of the movement information.

In a case where a plurality of past frames are used, the boundary estimating unit 105 calculates, for each past frame, an estimated boundary position in a next frame. The boundary estimating unit 105 calculates an estimated boundary position in a next frame on the basis of the calculation result and recursively repeats the boundary estimation processing until the estimated boundary position in the current frame is calculated. That is, in a case where N past frames exist, N pieces of estimated boundary information are output.

The boundary estimating unit 105 supplies one or more pieces of estimated boundary information indicative of an estimated boundary position to the smoothing unit 106.

The smoothing unit 106 performs smoothing processing (synthesizing processing) with respect to the boundary candidate information (information indicative of a boundary position detected by the transmitting/receiving unit 101 in the current frame) supplied from the boundary detecting unit 102 and the estimated boundary information (one or more pieces of information indicative of a boundary position in the current frame estimated from the past frame) supplied from the boundary estimating unit 105 so as to calculate a boundary position with a region around the vehicle (clearance region) where no object exists. The smoothing unit 106 outputs boundary information indicative of the calculated boundary position.

The smoothing unit 106 may calculate, for each direction, the average or the weighted average of positions (i.e., distances from the radar apparatus 100) of the reflection points indicated by the boundary candidate information and the estimated boundary information as a boundary position in the current frame.

In the smoothing processing, the smoothing unit 106, for example, determines the presence or absence of a boundary position in each direction in the boundary candidate information and the estimated boundary information. The smoothing unit 106 calculates a likelihood value of the boundary candidate information or the estimated boundary information by using a preset likelihood weight. In a case where the likelihood value is equal to or larger than a predetermined threshold value, the smoothing unit 106 determines that a boundary position exists.

Furthermore, in a case where a boundary position exists in each direction in the boundary candidate information and the estimated boundary information, the smoothing unit 106 calculates, as an output distance, a weighted average of distances of the boundary positions in the boundary candidate information and the estimated boundary information by using preset output value weights.

That is, the smoothing unit 106 outputs the output distance as a boundary position in a case where it is determined that a boundary position exists on the basis of the likelihood value.

Note that the aforementioned processing of the smoothing unit 106 is an example, and a boundary position may be derived by using another method. For example, the smoothing unit 106 extracts distances of boundary positions in extraction target directions, i.e., a direction of interest and left and right directions that are adjacent to the direction of interest from the boundary candidate information or the estimated boundary information and arranges the extracted distances in ascending order. After arranging the extracted distances, the smoothing unit 106 outputs a distance that is a median value as a distance of a boundary position in the direction of interest. Details will be described later.

In this way, the radar apparatus 100 specifies, as a clearance region, a region between a boundary line (a position of a reflection point closest to the vehicle) formed by connection or interpolation of boundary positions in respective directions in the detection range and the vehicle (see, for example, FIG. 2B). Operation of Radar Apparatus 100

Next, an example of the operation of the radar apparatus 100 is described in detail below with reference to FIGS. 5 and 6A through 6F.

Figure 5:
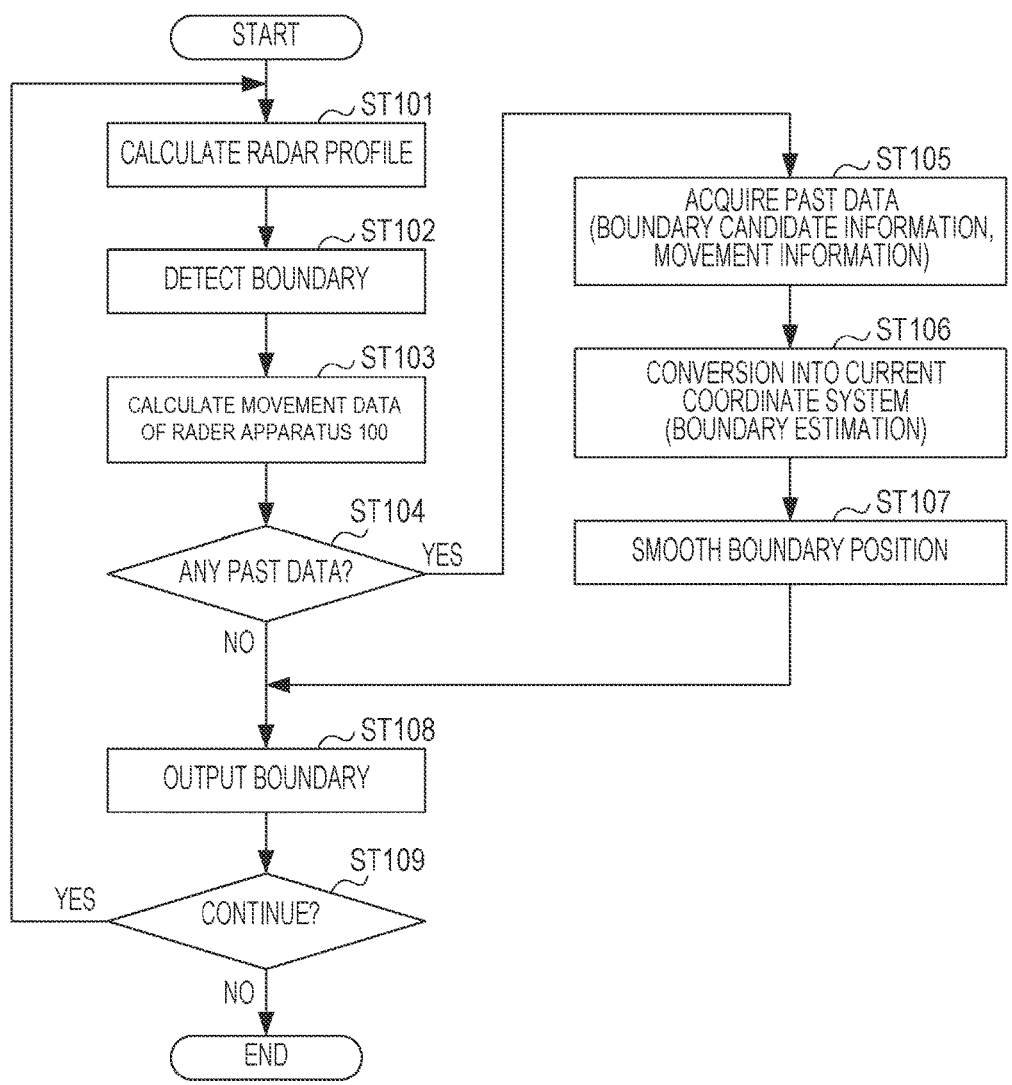
FIG. 5 is a flow chart illustrating operation of the radar apparatus according to Embodiment 1 of the present disclosure.

FIG. 5 is a flow chart illustrating a flow of operation of the radar apparatus 100.

FIGS. 6A through 6F are diagrams illustrating a radar coordinate system on which information obtained by the constituent elements of the radar apparatus 100 is shown. In the example of FIGS. 6A through 6F, a direction (horizontal axis) is expressed by 10 cells, and a distance (vertical axis) is expressed by 8 cells. That is, in FIGS. 6A through 6F, a reflection point is detected per cell in the transmitting/receiving unit 101. In the example of FIGS. 6A through 6F, a frame (previous frame) that is one frame before the current frame is a past frame.

In FIG. 5, the transmitting/receiving unit 101 calculates, in each frame, a radar profile in a radar detection range (see, for example, FIG. 2A) in Step (hereinafter simply referred to as "ST") 101. In FIGS. 6A through 6F, the transmitting/receiving unit 101 generates a radar profile in which a cell of a reflection point whose reflection intensity (power) is equal to or higher than a predetermined threshold value is expressed as a likely cell.

In ST102, the boundary detecting unit 102 detects, as a boundary candidate position, a position of a reflection point (cell) closest to the radar apparatus 100 on the basis of the radar profile generated in ST101. In FIGS. 6A through 6F, the boundary detecting unit 102 detects, in each direction, a position of a reflection point closest to the radar apparatus 100 as a selected cell among the reflection points (likely cells) in the radar profile. The boundary detecting unit 102 may determine whether or not a cell is a reflection point (likely cell) by using information on peripheral cells even in a case where no reflection point exists. In FIGS. 6A through 6F, the boundary detecting unit 102 generates boundary candidate information in which a position of the reflection point (selected cell) detected in each direction is expressed as a boundary candidate position.

In ST103, the movement amount calculating unit 103 calculates sensor (radar apparatus) movement data (a moving direction of the radar apparatus and a moving speed of the radar apparatus) on the basis of movement data (the direction and the speed) of the vehicle detected by various vehicle sensors and then generates movement information including the movement data of the radar apparatus 100.

In ST104, the boundary estimating unit 105 determines whether or not the boundary candidate information and movement information (past data) generated in the past are stored in the buffer 104. In a case where there is no past data (No in ST104), the radar apparatus 100 proceeds to the processing in ST108. The case where there is no past data is, for example, a time of initial calculation of boundary information.

In a case where there is past data (Yes in ST104), the boundary estimating unit 105 receives, as past data, boundary candidate information of one or more past frames and movement information corresponding to the respective past frames in ST105.

In ST106, the boundary estimating unit 105 converts a boundary candidate position (selected cell) in the past frame into a positon (estimated cell) on a coordinate system (current coordinate system) in a current frame by using the past data received in ST105. In a case where a plurality of positions exist in an identical direction after conversion, the boundary estimating unit 105 estimates, as an estimated boundary position, a position of a reflection point closest to the radar apparatus 100. In a case where boundary positions are continuously output in a past frame, the boundary estimating unit 105 may perform, for example, interpolation processing in order to secure a relationship with the past frame after conversion into the current frame.

Specifically, the boundary estimating unit 105 moves the boundary candidate position (selected cell) indicated by the boundary candidate information in the previous frame in accordance with a state of movement of the vehicle indicated by the movement information and then sets a position of the reflection point after the movement as an estimated boundary position (estimated cell). For example, in the radar profiles illustrated in FIGS. 6A through 6F, the vehicle advances by one cell in the front direction from the previous frame to the current frame in the movement information. The boundary estimating unit 105 sets, as the estimated boundary position (estimated cell), a position obtained by advancing the boundary candidate position (selected cell) in the previous frame by one cell in the front direction.

Figure 6C:
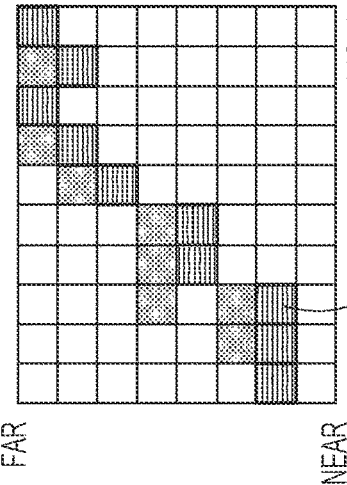
FIG. 6C is a diagram illustrating boundary candidate positions (selected cells) in a previous frame.
Figure 6B:
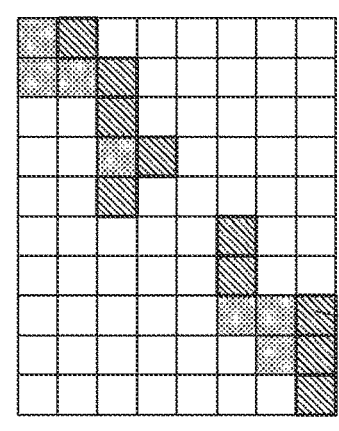
FIG. 6B is a diagram illustrating boundary candidate positions (selected cells) indicated by boundary candidate information in a current frame.
Figure 6A:
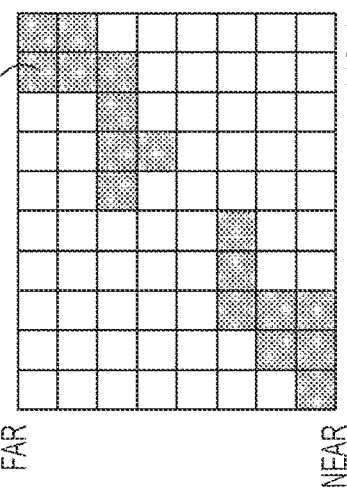
FIG. 6A is a diagram illustrating a radar profile of a current frame.
Figure 6D:
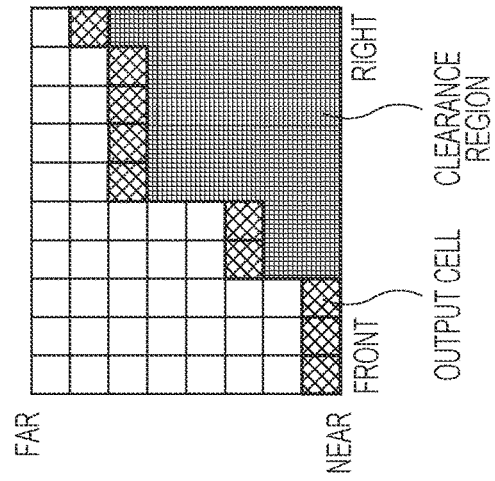
FIG. 6D is a diagram illustrating estimated boundary positions (estimated cells) indicated by estimated boundary information in the current frame.
Figure 6E:
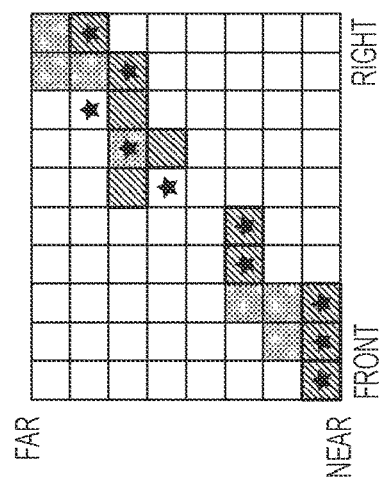
FIG. 6E is a diagram illustrating synthesis of the boundary candidate information and the estimated boundary information.
Figure 6F:
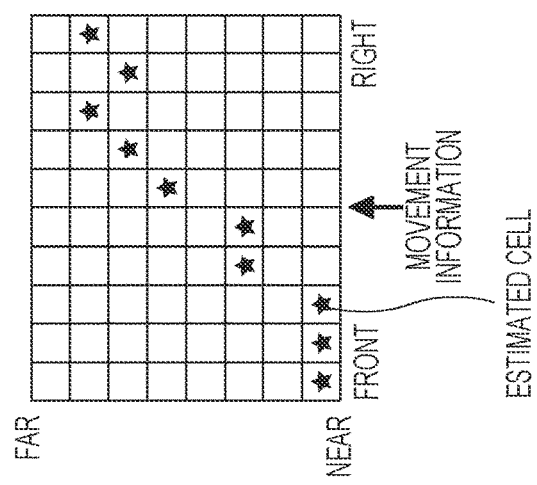
FIG. 6F is a diagram illustrating boundary information in the current frame.

FIG. 6A is a diagram illustrating a radar profile of the current frame, FIG. 6B is a diagram illustrating boundary candidate positions (selected cells) indicated by boundary candidate information in the current frame, FIG. 6C is a diagram illustrating boundary candidate positions (selected cells) in the previous cell, FIG. 6D is a diagram illustrating estimated boundary positions (estimated cells) indicated by estimated boundary information in the current frame, FIG. 6E is a diagram illustrating synthesis of the boundary candidate information and the estimated boundary information, and FIG. 6F is a diagram illustrating boundary information in the current frame.

In ST107, the smoothing unit 106 performs smoothing processing (FIG. 6E) with respect to the boundary candidate positions (FIG. 6B) indicated by the boundary candidate information in the current frame obtained in ST102 and the estimated boundary positions (FIG. 6D) indicated by the estimated boundary information obtained in ST106. That is, the smoothing unit 106 synthesizes the boundary candidate information and the estimated boundary information. The smoothing unit 106 performs smoothing processing between the boundary candidate positions detected in the current frame and the estimated boundary positions estimated from the boundary candidate positions detected in the previous frame (i.e., boundary candidate positions in the frames).

For example, in a case where a boundary candidate position in the current frame and a corresponding estimated boundary position are the same as each other in each direction, the smoothing unit 106 sets this position as a boundary position in the current frame. In a case where a boundary candidate position in the current frame and a corresponding estimated boundary position are different from each other in each direction, the smoothing unit 106 performs smoothing processing, for example, by calculating the average or the weighted average of distances corresponding to these positions and then sets a position obtained as a result of the processing as a boundary position in the current frame (FIG. 6F).

In a case where one or more estimated boundary positions exist, the smoothing unit 106 may determine, for example, whether or not a boundary position exists or determine an output distance by weighting each piece of information including a boundary candidate position (an example of this processing is a method using a likelihood value).

The smoothing unit 106 may determine an output position on the basis of boundary positions in peripheral directions instead of determining an output distance on the basis of the boundary positions illustrated in FIGS. 6A through 6F.

The smoothing unit 106 extracts distances in a direction of interest and adjacent directions on the left and right of the direction of interest from the boundary candidate information in the current frame and the estimated boundary information in the past frame and then stores the distances in a list. The smoothing unit 106 arranges the distances stored in the list in ascending order and then output a median value in the list as a distance of a boundary position in the direction of interest. Note that this processing is performed in all of the directions.

FIGS. 7A through 7C illustrate an image of this processing. In FIG. 7A, a direction of interest θ and adjacent ±2 directions on the left and right of the direction of interest are target directions, and estimated boundary information in past four frames is used. In FIG. 7A, the smoothing unit 106 extracts a distance in a matrix of target direction x target boundary information (boundary candidate information in the current frame and estimated boundary information in the past frames). Elements given "indeterminate" are elements in which a distance could not be determined as a result of the processing in the boundary detecting unit 102 or the boundary estimating unit 105.

In the matrix illustrated in FIG. 7A, the smoothing unit 106 extracts effective positions excluding the "indeterminate" positions, generates an effective position list illustrated in FIG. 7B, and arranges the effective positions in the list in ascending order in FIG. 7C. In FIG. 7C, a median value in the list after arranging the effective positions is "55", and therefore "55" is determined as a distance of a boundary position in the direction of interest θ.

A region closer to the vehicle than the boundary position (output cell) in the current frame output by the smoothing unit 106 may be regarded as a region around the vehicle (clearance region) in which no object exists (see FIGS. 6A through 6F).

In ST108, the smoothing unit 106 outputs the boundary information indicative of the boundary position in the current frame calculated in ST107 in a case where there is past data (Yes in ST104) and outputs the boundary candidate information calculated in ST102 as boundary information in the current frame in a case where there is no past data (No in ST104).

Note that the boundary information is not limited to information indicative of a boundary position and can be information indicative of a clearance region.

In ST109, the radar apparatus 100 determines whether or not to continue boundary information output processing. In a case where the boundary information output processing is continued (Yes in ST109), the radar apparatus 100 returns to the processing in ST101. In a case where the boundary information output processing is not continued (No in ST109), the radar apparatus 100 finishes the processing.

The radar apparatus 100 determines a boundary position between a clearance region and a region where an object exists by using an estimated boundary position in a current frame estimated from a boundary candidate position detected in a past frame in addition to a boundary candidate position detected in the current frame by the transmitting/receiving unit 101.

In a case where targets to be detected by the conventional radar apparatus include a weakly reflected wave, for example, from a pedestrian or a roadside object (see FIG. 2A), a threshold value for detection of the weakly reflected wave is set slightly high, and therefore the accuracy of detection of a reflected wave by the radar apparatus is insufficient. For example, an unstable object which is detected in one frame but is not detected in another frame by the radar apparatus exists.

However, the radar apparatus 100 according to the present embodiment can detect a boundary position with the clearance region by determining a likely cell in a frame by using peripheral cells or by estimating a position of a reflection point detected by the transmitting/receiving unit 101 by using a plurality of frames. That is, the radar apparatus 100 compensates a decline in accuracy of detection of a reflected wave by the transmitting/receiving unit 101 in the current frame by using a result of detection (boundary candidate information) in the current frame and at least one past frame.

According to the present embodiment, even in a case where the accuracy of detection of a reflection point by the transmitting/receiving unit 101 in each frame declines, it is possible to accurately detect a boundary position between a clearance region and a region where an object exists.

Furthermore, according to the present embodiment, the radar apparatus 100 detects a boundary position between a clearance region around a vehicle where no object exists and a region where an object exists and thus specifies the clearance region (see FIGS. 6A through 6F). That is, the radar apparatus 100 outputs a single region (see FIG. 6F) as a detection result instead of outputting a plurality of regions (segments) as in Japanese Patent No. 5206579 (see, for example, FIGS. 2A and 2B). That is, the radar apparatus 100 omits identification of an identical object between frames and uses smoothing processing of a boundary candidate position.

By handling, as a single continuous object, a series of objects (e.g., another vehicle, a pedestrian, a roadside object) around the vehicle in which the radar apparatus 100 is mounted, it is possible to prevent the radar apparatus 100 from mistakenly detecting each object as an object that ceases to be detected during a period from the entry of the object to the detection range of the radar apparatus 100 to the exit of the object from the detection range or as a different object (different ID).

For example, even in a case where a result of detection of an object by the transmitting/receiving unit 101 is unstable, i.e., varies between frames, the radar apparatus 100 can stably specify a clearance region while suppressing the influence caused by the object whose detection result is unstable by interpolating an accurately detected boundary position (output cell illustrated in FIGS. 6A through 6F).

According to the present embodiment, the radar apparatus 100 can stably detect and track an object over a plurality of frames even in a case where targets to be detected by the radar apparatus 100 include an object, such as a roadside object (e.g., shrubbery or a guardrail), that is assumed to have various shapes and sizes.

Since the radar apparatus 100 can stably track an object and improve performance of detecting a clearance region according to the present embodiment as described above, it is possible to improve system accuracy and response of a apparatus provided subsequently to the radar apparatus 100 such as a driving support apparatus (not illustrated) of a collision prevention apparatus.

In the above embodiment, a case where past boundary candidate information is stored as past data in the buffer 104 has been described. However, past boundary information (i.e., output of the smoothing unit 106) may be stored as past data in the buffer 104.

Embodiment 2

In Embodiment 1, a region in which no still object and no moving object exists is extracted as a clearance region. In the present embodiment, a region in which no still object exists is extracted as a still object clearance region. Configuration of Radar Apparatus 200

Figure 8B:
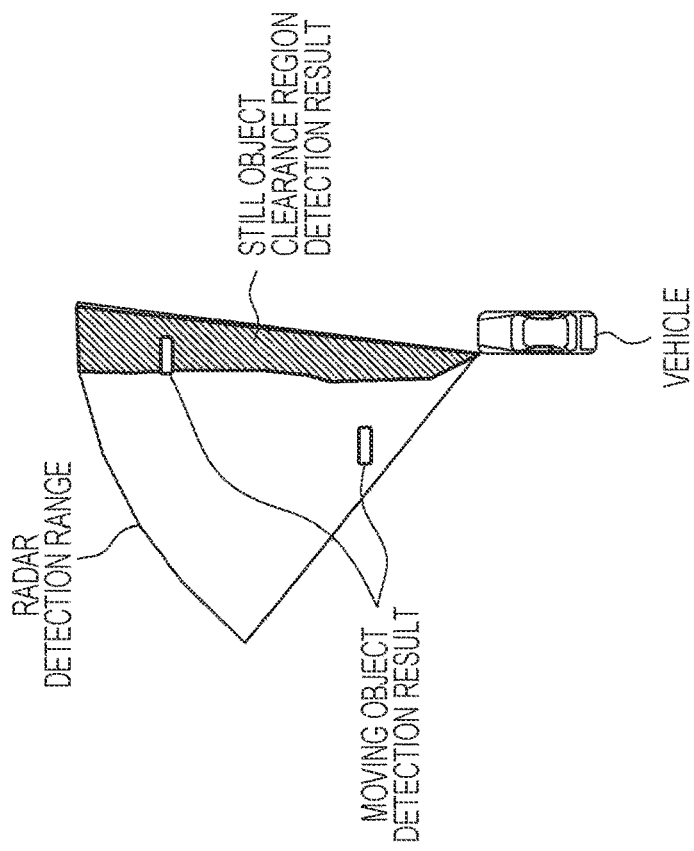
FIG. 8B is a diagram illustrating a clearance region.
Figure 8A:
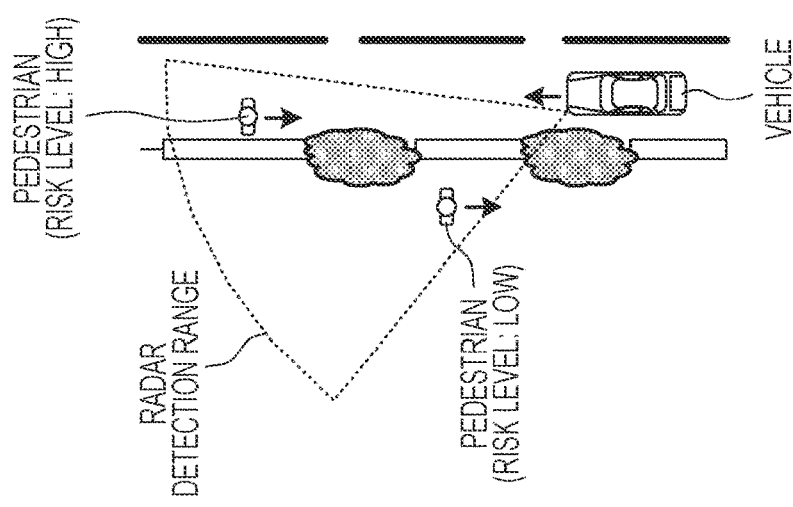
FIG. 8A is a diagram illustrating objects around a vehicle.

A radar apparatus 200 according to an embodiment of the present disclosure is mounted in a vehicle illustrated in FIG. 8A.

The radar apparatus 200 detects an object (another vehicle, a pedestrian, a roadside object) that exists around (e.g., in front of or diagonally in front of) the vehicle in which the radar apparatus 200 is mounted and determines a region around the vehicle (hereinafter referred to as a "still object clearance region") in which no still object exists on the basis of the detected information (see, for example, FIG. 8B; details will be described later). Note that the roadside object encompasses, for example, a guardrail and a tree.

The radar apparatus 200 provides, for example, information on the determined still object clearance region, for example, to a collision prevention apparatus (not illustrated)

which serves as a driving support apparatus. Note that the radar apparatus 200 may detect a moving object (e.g., a vehicle or a pedestrian) by using another method in addition to the still object clearance region (see FIG. 8B).

Figure 9A:
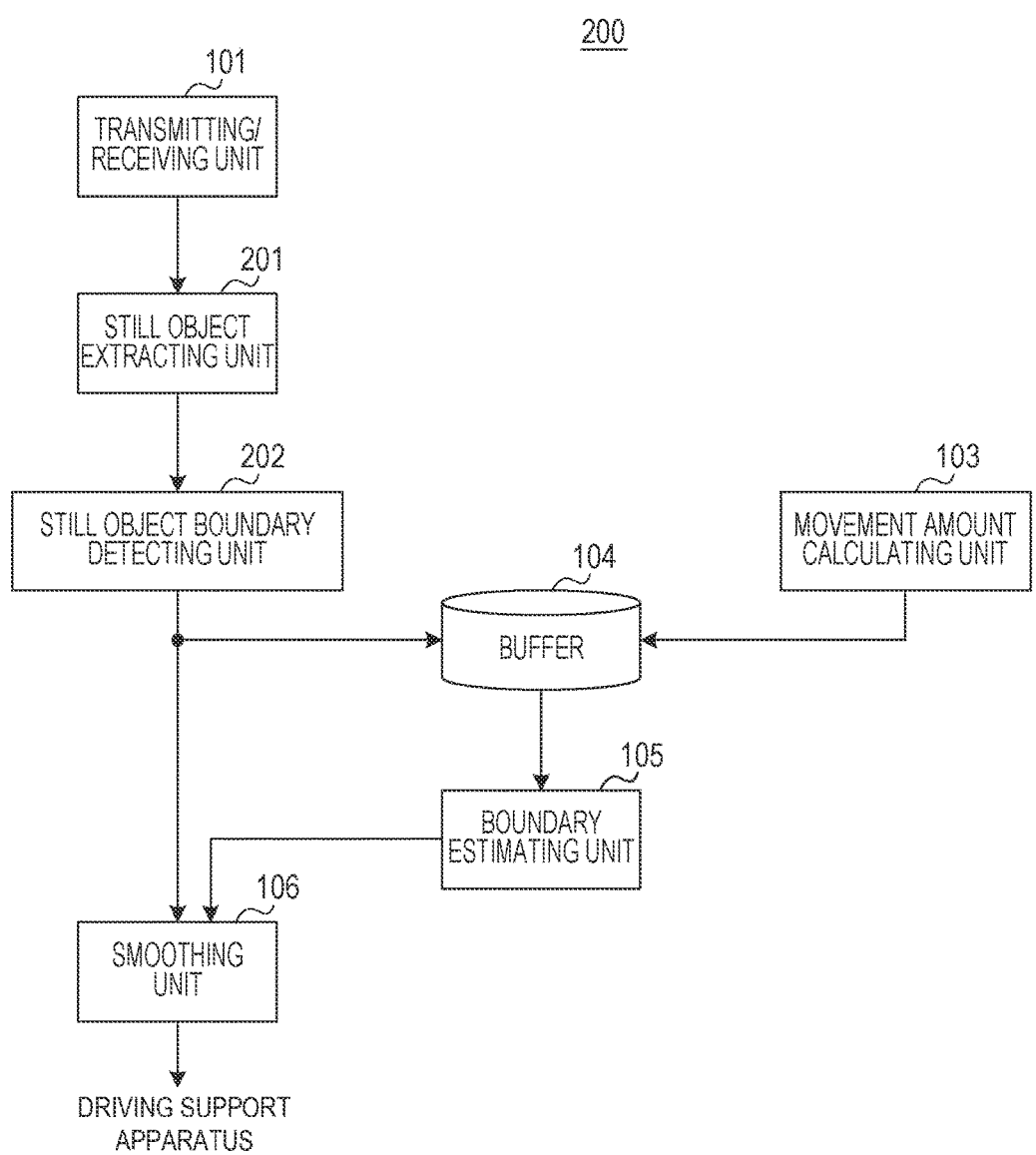
FIG. 9A is a diagram illustrating an example of a radar apparatus according to Embodiment of the present disclosure.

FIG. 9A is a block diagram illustrating an example of a configuration of the radar apparatus 200. The radar apparatus 200 illustrated in FIG. 9A includes a transmitting/receiving unit 101, a still object extracting unit 201, a still object boundary detecting unit 202, a movement amount calculating unit 103, a buffer 104, a boundary estimating unit 105, and a smoothing unit 106. Description of the contents described in Embodiment 1 other than the still object extracting unit 201 and the still object boundary detecting unit 202 is omitted.

The still object extracting unit 201 extracts a still object by using reflection point information (Doppler value) in each frame received from the transmitting/receiving unit 101 and a movement direction and a movement speed which are movement data of the radar apparatus received from the movement amount calculating unit 103.

Figure 9B:
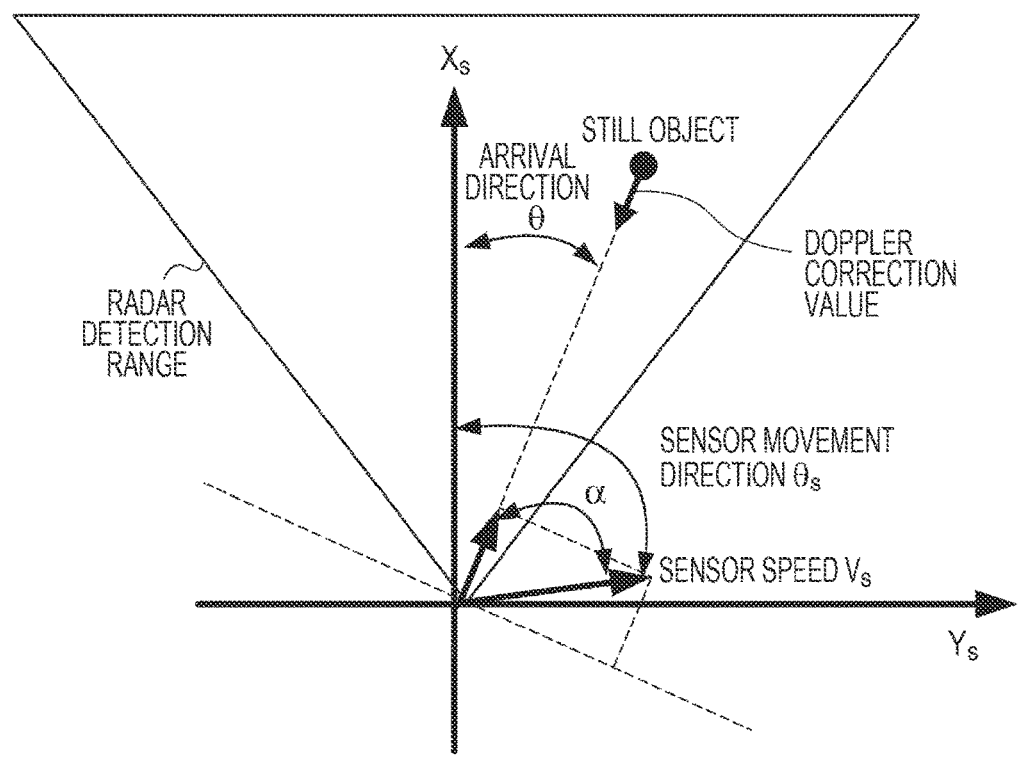
FIG. 9B is a diagram illustrating a relationship between a moving vehicle and a Doppler correction value obtained from a still object.

An example of a method for extracting a still object is described with reference to FIG. 9B. FIG. 9B is a diagram illustrating a relationship between a moving vehicle and a Doppler correction value obtained from a still object.

$\theta_s$ is a movement direction of the vehicle (sensor movement direction) and moves in a positive direction (an upper right direction in FIG. 9B) in the first quadrant. $V_s$ is a movement speed of the vehicle (sensor speed), $X_s$ is a front direction of the radar apparatus 200 (sensor), and $\theta$ is a direction in which a still object is located. In FIG. 9B, a still object exists in the first quadrant.

Note that a calculation formula for observation of the still object located in the direction $\theta$ (a Doppler correction value in the direction $\theta$) is the following formula (1) using the sensor movement speed $V_s$ and an angle $\alpha$ $(=\theta_s-\theta)$ defined by the sensor movement direction $\theta_s$ and the direction $\theta$ of the still object:

$$D_{Offset}(\theta)[km/h] = V_s \cos(\alpha) = V_s \cos(\theta_s - \theta) \qquad (1)$$

The still object extracting unit 201 determines whether or not a Doppler value of a reflection point in each frame and each direction measured by the radar apparatus 200 is within a range obtained by adding a margin to the Doppler correction value calculated on the basis of the formula (1). In a case where the Doppler value is within the range, the reflection point is extracted as a still object and is then supplied to the still object boundary detecting unit 202.

The still object boundary detecting unit 202 detects a position of a reflection point (hereinafter referred to as a still object boundary candidate position) that serves as a boundary with a region around the vehicle in which no still object exists (still object clearance region).

The still object boundary detecting unit 202 detects, every frame in each direction within the detection rage of the radar apparatus 200, a position of a reflection point that is a reflection point of the still object extracted by the still object extracting unit 201 and that is closest to the radar apparatus 200 among reflection points indicated by reflection point information.

That is, the still object boundary detecting unit 202 detects a candidate of a boundary between the still object clearance region and a region in which a still object exists. For example, the still object boundary detecting unit 202 may detect a still object boundary candidate by interpolation processing. Specifically, in a case where it is determined, by using information on a plurality of peripheral cells around an evaluation target cell (a reflection point that is evaluated), that the percentage of peripheral cells whose power exceeds a power threshold value among the plurality of peripheral cells is equal to or larger than a certain value, the still object boundary detecting unit 202 may detect the evaluation target cell as a still object boundary candidate.

Note that the still object boundary candidate position need not be the closest reflection point which is a still object and can be a reflection point obtained after averaging processing in a plurality of frames.

The still object boundary detecting unit 202 supplies still object boundary candidate information indicative of the detected still object boundary candidate position to the buffer 104 and the smoothing unit 106. Note that the still object boundary candidate information is, for example, expressed by a radar coordinate system of the transmitting/receiving unit 101.

The buffer 104 stores therein the still object boundary candidate information supplied from the still object boundary detecting unit 202 and the movement information supplied from the movement amount calculating unit 103. Note that the number of past frames is not limited to one and can be more than one. In a case where a plurality of past frames are stored in the buffer 104, the past frames paired (associated) with corresponding movement information are stored in the buffer 104. The buffer 104 supplies the stored still object boundary candidate information of the past frame and movement information to the boundary estimating unit 105.

The boundary estimating unit 105 receives the still object boundary candidate information of the past frame and the movement information indicative of a state of movement of the vehicle from the past frame to the current frame. The boundary estimating unit 105 estimates, as an estimated still object boundary position, the position of a reflection point that is a still object and that is closest to the radar apparatus 200 in the current frame on the basis of the still object boundary candidate information of the past frame and the movement information.

The boundary estimating unit 105 supplies one or more pieces of estimated still object boundary information indicative of an estimated still object boundary position to the smoothing unit 106.

The smoothing unit 106 performs smoothing processing (synthesizing processing) with respect to the still object boundary candidate information (information indicative of a boundary position detected by the transmitting/receiving unit 101 in the current frame) supplied from the still object boundary detecting unit 202 and the estimated still object boundary information (one or more pieces of information indicative of a still object boundary position in the current frame estimated from the past frame) supplied from the boundary estimating unit 105 so as to calculate a boundary position with a region around the vehicle (still object clearance region) where no still object exists. The smoothing unit 106 outputs still object boundary information indicative of the calculated boundary position.

In this way, the radar apparatus 200 specifies, as a still object clearance region, a region between a boundary line (a position of a reflection point from the still object closest to the vehicle) formed by connection or interpolation of still object boundary positions in respective directions in the detection range and the vehicle (see, for example, FIG. 8B).

Operation of Radar Apparatus 200

Next, an example of the operation of the radar apparatus 200 is described in detail below with reference to FIGS. 10A through 10F.

FIGS. 10A through 10F are diagrams illustrating a radar coordinate system on which information obtained by the constituent elements of the radar apparatus 200 is shown. As in FIGS. 6A through 6F, a direction (horizontal axis) is expressed by 10 cells, and a distance (vertical axis) is expressed by 8 cells. That is, in FIGS. 10A through 10F, a reflection point is detected per cell in the transmitting/receiving unit 101. In the example of FIGS. 10A through 10F, a frame (previous frame) that is one frame before the current frame is a past frame.

Figure 10C:
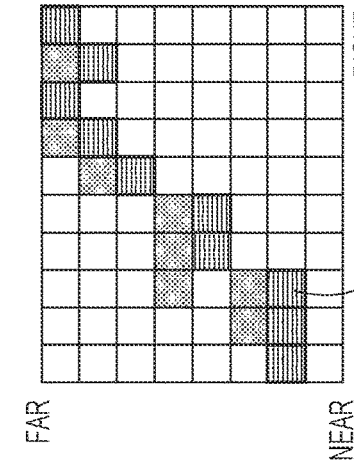
FIG. 10C is a diagram illustrating a still object boundary candidate position (selected cell) in a previous frame.
Figure 10B:
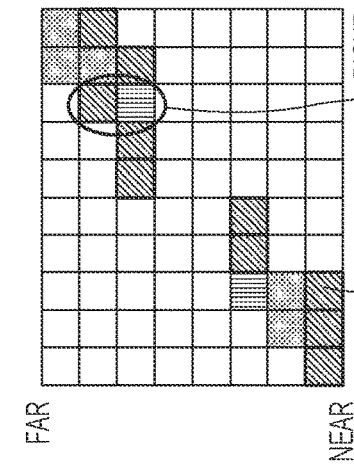
FIG. 10B is a diagram illustrating a still object boundary candidate position (selected cell) indicated by still object boundary candidate information in a current frame.
Figure 10A:
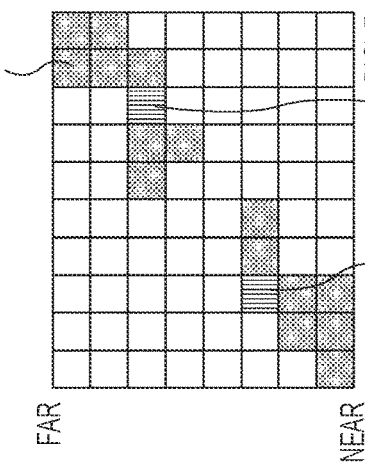
FIG. 10A is a diagram illustrating a radar profile of a current frame.
Figure 10D:
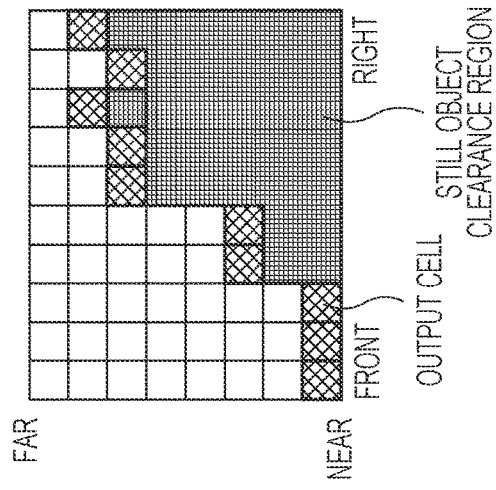
FIG. 10D is a diagram illustrating an estimated boundary position (estimated cell) indicated by estimated still object boundary information in the current frame.
Figure 10E:
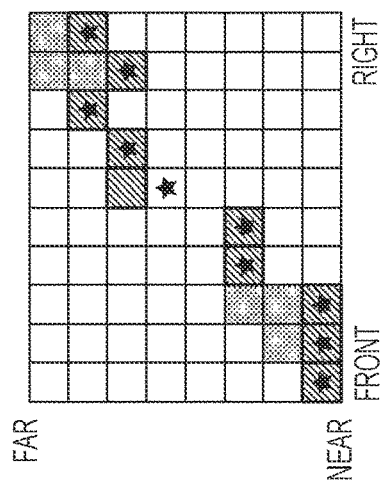
FIG. 10E is a diagram illustrating synthesis of still object boundary candidate information and estimated still object boundary information.
Figure 10F:
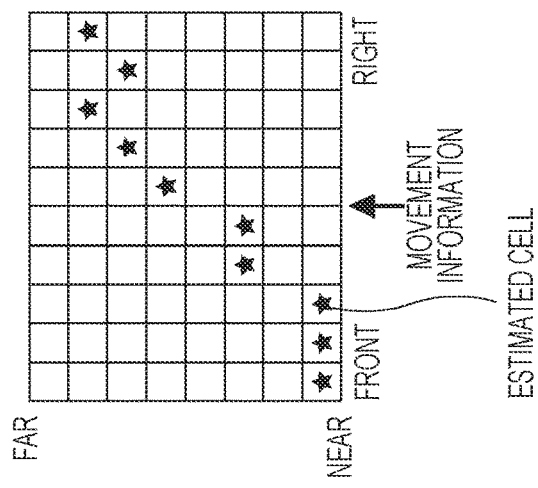
FIG. 10F is a diagram illustrating still object boundary information in the current frame.

FIG. 10A is a diagram illustrating a radar profile of the current frame, FIG. 10B is a diagram illustrating boundary candidate positions (selected cells) indicated by still object boundary candidate information in the current frame, FIG. 10C is a diagram illustrating still object boundary candidate positions (selected cells) in the previous frame, FIG. 10D is a diagram illustrating estimated still object boundary positions (estimated cells) indicated by estimated still object boundary information in the current frame, FIG. 10E is a diagram illustrating synthesis of the still object boundary candidate information and the estimated still object boundary information, and FIG. 10F is a diagram illustrating still object boundary information in the current frame.

In FIGS. 10A through 10F, the transmitting/receiving unit 101 generates a radar profile in which a cell of a reflection point whose reflection intensity (power) is equal to or higher than a predetermined threshold value is expressed as a likely cell.

The still object extracting unit 201 extracts a still object from the radar profile by using the Doppler correction value illustrated in FIG. 9B, and the still object boundary detecting unit 202 detects, as a still object boundary candidate position, a position of a reflection point (cell) closest to the radar apparatus 200 among reflection points of the still object extracted by the still object extracting unit 201

In FIGS. 10A through 10F, the still object boundary detecting unit 202 may determine whether or not a cell is a reflection point (likely cell) by using information on peripheral cells even in a case where no reflection point exists. In FIGS. 10A through 10F, the still object extracting unit 201 extracts the position of the still object from positions of reflection points (selected cells) detected in respective directions (FIG. 10B), and the still object boundary detecting unit 202 generates still object boundary candidate information expressed as a still object boundary candidate position from the extracted position.

Note that the moving object is an object that has been determined as a non-still object, i.e., an object that has been determined as an object having a Doppler speed that is equal to or larger than the set threshold value in the still object extracting unit 201 as described with reference to FIG. 9B for example.

The boundary estimating unit 105 determines whether or not the still object boundary candidate information and movement information (past data) generated in the past are stored in the buffer 104. Note that the case where there is no past data is, for example, a time of initial calculation of boundary information.

In a case where there is past data, the boundary estimating unit 105 receives, as past data, still object boundary candidate information of one or more past frames and movement information corresponding to the respective past frames from the buffer 104.

The boundary estimating unit 105 converts a still object boundary candidate position (selected cell) in the past frame into a positon (estimated cell) on a coordinate system (current coordinate system) in a current frame by using the past data (FIG. 10). In a case where a plurality of positions exist in an identical direction after conversion, the boundary estimating unit 105 estimates, as an estimated still object boundary position, a position of a reflection point of the still object closest to the radar apparatus 200 (FIG. 10D). In a case where boundary positions are continuously output in a past frame, the boundary estimating unit 105 may perform, for example, interpolation processing in order to secure a relationship with the past frame after conversion into the current frame.

Specifically, the boundary estimating unit 105 moves the boundary candidate position (selected cell: FIG. 10O) indicated by the still object boundary candidate information in the previous frame in accordance with a state of movement of the vehicle indicated by the movement information and then sets a position of the reflection point after the movement as an estimated still object boundary position (estimated cell: FIG. 10D). For example, in the radar profiles illustrated in FIGS. 10A through 10F, the vehicle advances by one cell in the front direction from the previous frame to the current frame in the movement information. The boundary estimating unit 105 sets, as the estimated still object boundary position (estimated cell), a position obtained by advancing the still object boundary candidate position (selected cell) in the previous frame by one cell in the front direction.

The smoothing unit 106 performs smoothing processing (FIG. 10E) with respect to the still object boundary candidate positions (FIG. 10B) indicated by the still object boundary candidate information in the current frame and the estimated still object boundary positions (FIG. 10D) indicated by the estimated still object boundary information.

Unlike Embodiment 1, in a case where there is a moving object closer than the still object as illustrated in FIG. 10B, a still object boundary candidate position is output on the basis of a distance to the still object. The smoothing unit 106 synthesizes the still object boundary candidate information and the estimated still object boundary information.

The smoothing unit 106 performs smoothing processing between the still object boundary candidate positions detected in the current frame and the estimated still object boundary positions estimated from the still object boundary candidate positions detected in the previous frame (i.e., still object boundary candidate positions in the frames).

For example, in a case where a still object boundary candidate position in the current frame and a corresponding estimated still object boundary position are the same as each other in each direction, the smoothing unit 106 sets this position as a still object boundary position in the current frame. In a case where a still object boundary candidate position in the current frame and a corresponding estimated still object boundary position are different from each other in each direction, the smoothing unit 106 performs smoothing processing, for example, by calculating the average or the weighted average of distances corresponding to these positions and then sets a position obtained as a result of the processing as a still object boundary position in the current frame (FIG. 10F).

According to the present embodiment, the radar apparatus 200 can stably detect and track a still object over a plurality of frames even in a case where targets to be detected by the radar apparatus 200 include a still object, such as a roadside object (e.g., shrubbery or a guardrail), that is assumed to have various shapes and sizes.

Since detection performance of an object (e.g., a pedestrian) that moves in a region closer to the radar apparatus 200 than a still object boundary can be improved (FIG. 11C) by combining a detection result of a moving object detected by a moving object detecting unit (not illustrated) illustrated in FIG. 11B in the radar profile in the current frame illustrated in FIG. 11A with the still object boundary positions in the current frame illustrated in FIG. 10F, it is possible to improve system accuracy and response of a apparatus provided subsequently to the radar apparatus 200 such as a driving support apparatus (not illustrated) of a collision prevention apparatus.

Embodiment 3

In the present embodiment, an object recognition apparatus (on-board radar apparatus) obtained by adding a camera apparatus to the radar apparatus described in Embodiment 1 or 2 is described.

Configuration of Objet Recognition Apparatus 300

An object recognition apparatus 300 according to the embodiment of the present disclosure is mounted in a vehicle illustrated in FIG. 12A.

As in Embodiment 2, a radar mounted in the object recognition apparatus 300 detects an object (another vehicle, a pedestrian, a roadside object) that exists around the vehicle (e.g., in front of the vehicle or diagonally in front of the vehicle) in which the object recognition apparatus 300 is mounted and determines a region around the vehicle (hereinafter referred to as a "still object clearance region") in which no still object exists on the basis of the detected information (see, for example, FIG. 8B; details will be described later). Note that the roadside object encompasses, for example, a guardrail and a tree.

A camera mounted in the object recognition apparatus 300 senses the object (another vehicle, a pedestrian, a roadside object) that exists around the vehicle (e.g., in front of the vehicle or diagonally in front of the vehicle) in which the object recognition apparatus 300 is mounted, and detects and recognizes the object around the vehicle on the basis of the sensed information.

Figure 12:
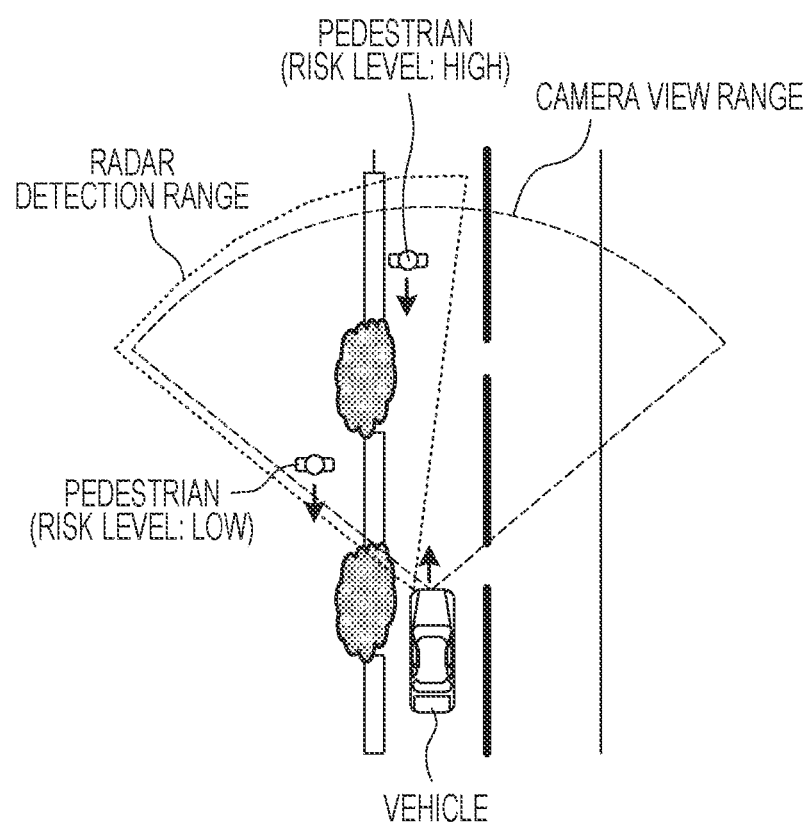
FIG. 12 is a diagram illustrating objects around a vehicle according to Embodiment 3 of the present disclosure.

It is known that the accuracy of detection and recognition of an object can be increased by causing a radar detection range and a camera view (sensing) range to overlap each other as illustrated in FIG. 12 and thus fusing detection and perception results. This is called a fusion method.

Figure 13:
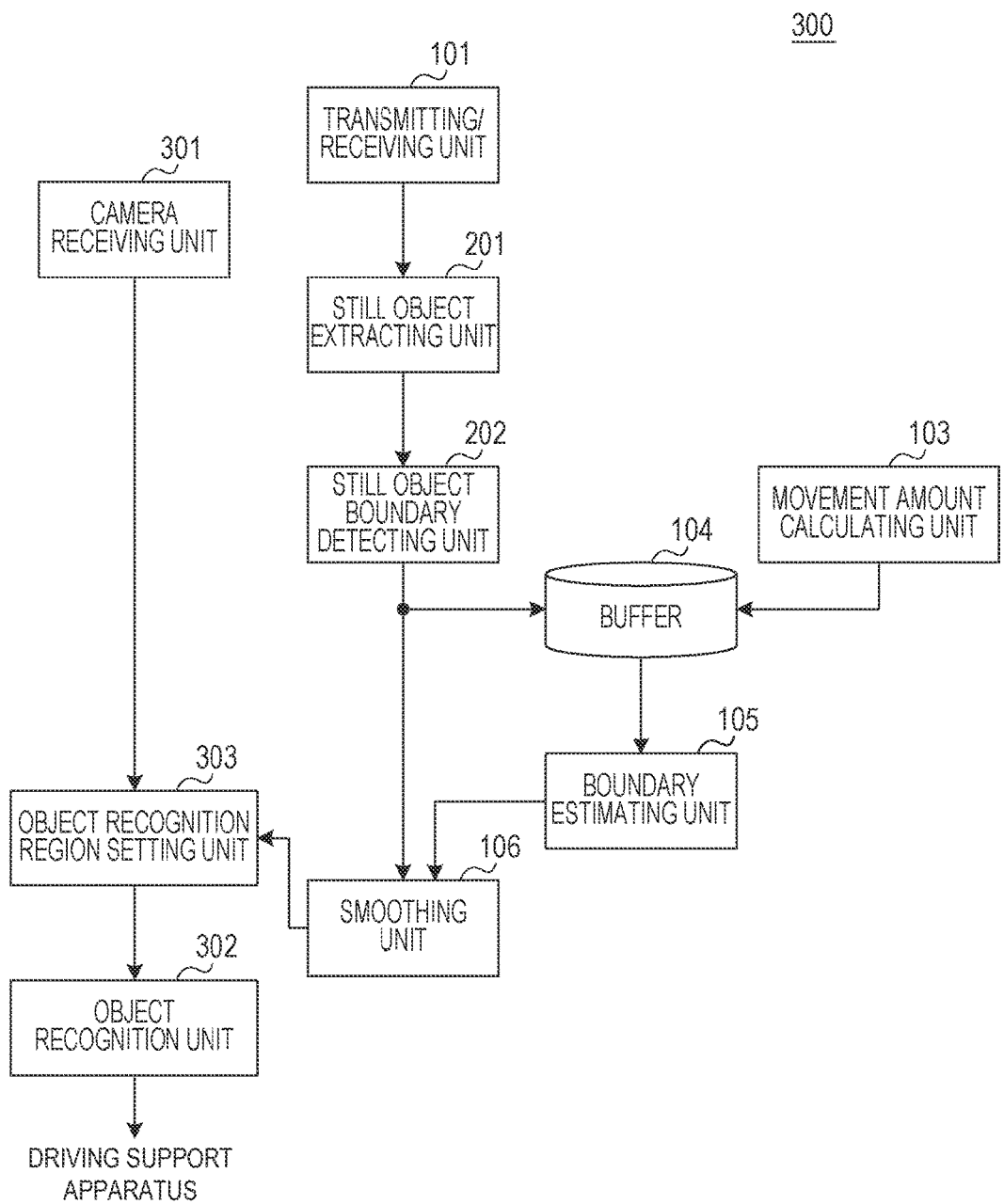
FIG. 13 is a diagram illustrating an example of a configuration of an object recognition apparatus according to Embodiment 3 of the present disclosure.

FIG. 13 is a block diagram illustrating an example of a configuration of the object recognition apparatus 300. Description of the contents described in Embodiment 1 or 2 other than a camera receiving unit 301, an object recognition unit 302, and an object recognition region setting unit 303 is omitted.

The camera receiving unit 301 supplies a received-light signal (also called luminance information or image information) to the object recognition region setting unit 303 at certain intervals (e.g., 20 times per second).

The object recognition region setting unit 303 sets an object recognition region on the basis of the image information received from the camera receiving unit 301 and a still object boundary position in a current frame received from a smoothing unit 106, and then supplies the object recognition region to the object recognition unit 302. Details will be described below with reference to FIGS. 14A through 14C.

The object recognition unit 302 detects and recognizes an object within a range of the object recognition region supplied from the object recognition region setting unit 303. For pattern recognition of an image, an recognizer is created (not illustrated) by statistical learning computation by using a plurality of Positive (detection target) samples and a plurality of Negative (non-detection-target) samples as disclosed in Nishimura et al. Development of Image Sensing Technology for Automotive Field, Panasonic Technical Journal, October 2011. P.64. Recognition processing can be repeatedly performed by enlarging or reducing a detection target region image and performing raster scan per window of a sample size to recognize a pedestrian in an image.

Figure 14C:
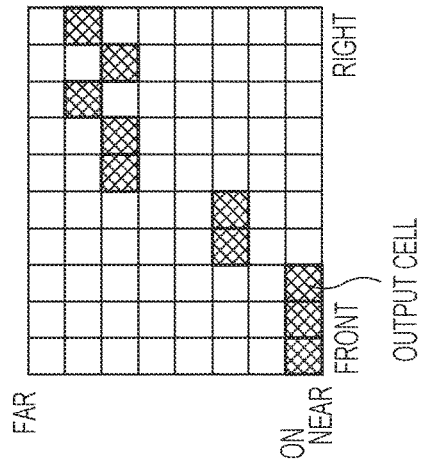
FIG. 14C is a diagram illustrating still object boundary information in a current frame.
Figure 14B:
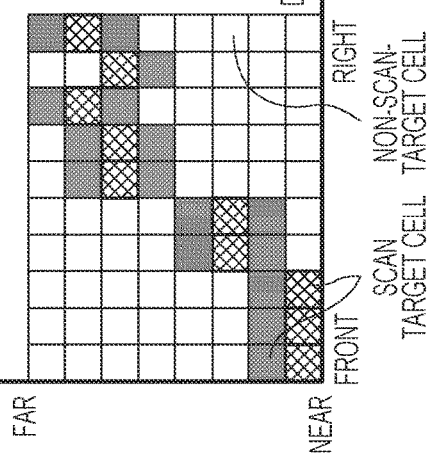
FIG. 14B is a diagram illustrating object recognition region information.
Figure 14A:
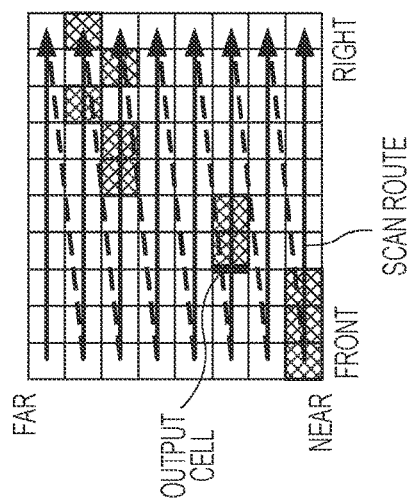
FIG. 14A is a diagram illustrating a raster scan method.

FIG. 14A is a diagram for explaining the raster scan method. Recognition processing is performed with respect to all cells of a detection target region image. As illustrated in FIG. 14A, recognition processing is performed with respect to all cells from the farthest cell in a front direction (an upper left cell in FIG. 14A) to the nearest cell on the right (a lower right cell in FIG. 14A). Accordingly, the amount of computation is large, and therefore response to hardware load and processing delay is required.

FIG. 14B is a diagram illustrating an example of an object recognition region (scan target output cell) in the present embodiment. Peripheral cells of the output cell, for example, adjacent cells of the output cell in a distance axis direction are to be subjected to the recognition processing (object recognition region information) on the basis of still object boundary information in the current frame (FIG. 14C). Note that the peripheral cells are not limited to the adjacent cells. This makes it possible to reduce the problem of the amount of computation in the recognition processing, thereby allowing a reduction in the size of hardware and high-speed processing.

Detection of a moving object (a vehicle, a bicycle, a person, or an animal) that runs out of the vicinity of a still object boundary has a high affinity for a traffic accident and a near miss (incident) and is therefore effective for reduction of the number of traffic accidents.

Since the object recognition apparatus 300 according to the present embodiment can improve performance of detecting a moving object that is highly likely to collide with the vehicle as described above, it is possible to improve system accuracy and response of a apparatus provided subsequently to the object recognition apparatus 300 such as a driving support apparatus (not illustrated) of a collision prevention apparatus.

In the present embodiment, still object boundary information (FIG. 14C) is used. However, the present embodiment is not limited to this. For example, the present embodiment can also be achieved by using boundary information in a current frame described in FIG. 6F of Embodiment 1.

The radar apparatus 100 includes, for example, a CPU (Central Processing Unit), a storage medium such as a ROM (Read Only Memory) in which control programs are stored, and a working memory such as a RAM (Random Access Memory), each of which is not illustrated. In this case, the functions of the units described above are realized by CPU's execution of the control programs. However, the hardware configuration of the radar apparatus 100 is not limited to this example. For example, the functional units of the radar apparatus 100 may be realized as an IC (Integrated Circuit). The functional units may be realized as individual chips or some or all of the functional units may be realized as a single chip.

Various aspects of the embodiment according to the present disclosure include the following.

An on-board radar apparatus according to the first disclosure includes: a transmitter/receiver that transmits a radar signal to a detection range every frame and receives one or more reflected signals which are the radar signal reflected by one or more objects; a detector that detects, every frame in each direction within the detection range, a position of a reflection point closest to the on-board radar apparatus as a boundary candidate position, which serves as a boundary with a region where no object exists within the detection range, among one or more reflection points detected on the basis of the one or more reflected signals; a calculator that calculates movement amount concerning an amount of movement of the on-board radar apparatus; an estimator that generates, every frame in each direction within the detection range, an estimated boundary position by converting the boundary candidate position detected in a past frame into a boundary position in a current frame on the basis of the movement amount; and a smoother that performs, every frame in each direction within the detection range, smoothing processing by using the boundary candidate position in the current frame and the estimated boundary position to calculate a boundary position with the region where no object exists within the detection range and outputs the calculated the boundary position to a driving support apparatus.

An on-board radar apparatus according to the second disclosure is the on-board radar apparatus according to the first disclosure and is arranged such that the smoother calculates, every frame in each direction within the detection range, a likelihood value of the boundary candidate position or the estimated boundary position by using a preset likelihood weight and determines, every frame in each direction within the detection range, that a boundary position exists in a case where the likelihood value is equal to or larger than a predetermined threshold value and in a case where boundary position is determined to be existed in each direction within the detection range, outputs, every frame in each direction within the detection range, the boundary position calculated by using a weighted average of distances between the on-board radar apparatus and the boundary candidate position in the current frame or the estimated boundary position by using preset output value weights.

A region detection method according to the third disclosure in an on-board radar apparatus includes: transmitting a radar signal to a detection range every frame and receiving one or more reflected signals which are the radar signal reflected by one or more objects; detecting, every frame in each direction within the detection range, a position of a reflection point closest to the on-board radar apparatus as a boundary candidate position, which serves as a boundary with a region where no object exists within the detection range, among one or more reflection points detected on the basis of the one or more reflected signals; calculating movement amount data concerning an amount of movement of the on-board radar apparatus; generating an estimated, every frame in each direction within the detection range, boundary position by converting the boundary candidate position detected in a past frame into a boundary position in a current frame on the basis of the movement amount data; performing smoothing, every frame in each direction within the detection range, processing by using the boundary candidate position in the current frame and the estimated boundary position to calculate a boundary position with the region where no object exists within the detection range; and outputting, every frame in each direction within the detection range, the calculated the boundary position to a driving support apparatus.

A region detection method according to the fourth disclosure is the region detection method according to the third disclosure and is arranged such that in the smoothing processing, every frame in each direction within the detection range, a likelihood value of the boundary candidate position or the estimated boundary position is calculated by using a preset likelihood weight, in a case where the likelihood value is equal to or larger than a predetermined threshold value, the boundary position is determined to be existed, and the boundary position calculated by using a weighted average of distances between the on-board radar apparatus and the boundary candidate position in the current frame or the estimated boundary position by using preset output value weights is output.

Various embodiments have been described above with reference to the drawings, but the present disclosure is not limited to these examples. It is clear that a person skilled in the art can arrive at various changes or modifications within the scope described in the claims, and it is understood that these changes or modifications are also encompassed within the technical scope of the present disclosure. Furthermore, the constituent elements in the embodiments may be combined in any ways as long as the combination is not deviated from the purpose of the present disclosure.

In the embodiment above, a case where the present disclosure is realized by using hardware has been described as an example. However, the present disclosure may be realized by software in combination with hardware.

The functional blocks used for description of the embodiment are typically realized as an LSI which is an integrated circuit having an input terminal and an output terminal. These functional blocks may be realized as individual chips or some or all of the functional blocks may be realized as a single chip. The term "LSI" is used, but the term "IC", "system LSI", "super LSI", or "ultra LSI" may be used depending on the degree of integration.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique. One possibility is application of biotechnology.

One aspect of the present disclosure is suitable as a radar apparatus mounted in a vehicle.

What is claimed is:

1. An on-board radar apparatus comprising:
a transmitter/receiver, which, in operation, transmits a radar signal to a detection range in every frame and receives one or more reflected signals which are the radar signal reflected by one or more objects;
a detector, which, in operation, detects, for every frame in each direction within the detection range, a position of a reflection point closest to the on-board radar apparatus as a boundary candidate position, for a region where no object exists within the detection range, among one or more reflection points detected in the respective frame for the one or more reflected signals;
a calculator, which, in operation, calculates movement amount concerning an amount of movement of the on-board radar apparatus;
an estimator, which, in operation, generates, for every frame in each direction within the detection range, an estimated boundary position from the boundary candidate position detected in a past frame and a conversion into a current frame on the basis of the movement amount; and
a smoother, which, in operation, performs, for every frame in each direction within the detection range, smoothing processing by using the boundary candidate position in the current frame and the estimated boundary position for the current frame to determine a presence or absence of a boundary position with the region where no object exists within the detection range, and outputs the boundary position to a driving support apparatus in a case where the determined result is the presence of the boundary position.

2. The on-board radar apparatus according to claim 1, wherein the smoother calculates, for every frame in each direction within the detection range, a likelihood value of the boundary candidate position or the estimated boundary position by using a preset likelihood weight, determines, for every frame in each direction within the detection range, that the boundary position is present in a case where the likelihood value is equal to or larger than a predetermined threshold value, and outputs, in a case where the determined result is the presence of the boundary position in each direction within the detection range, for every frame in each direction within the detection range, the boundary position calculated by using a weighted average of distances between the on-board radar apparatus and the boundary candidate position in the current frame or the estimated boundary position using preset output value weights.

3. The on-board radar apparatus according to claim 1, wherein
the one or more objects includes two or more objects, and
the two or more objects include a still object and a moving object.

4. The on-board radar apparatus according to claim 1, wherein
the one or more objects are one or more still objects.

5. The on-board radar apparatus according to claim 1, further comprising:
a camera, which, in operation, captures an image of the detection range;
a region setter, which, in operation, sets an image region used for object recognition in the captured image on the basis of the boundary position; and
an object recognizer, which, in operation, performs object recognition on the set image region.

6. A region detection method comprising:
transmitting a radar signal to a detection range in every frame;
receiving one or more reflected signals which are the radar signal reflected by one or more objects;
detecting, for every frame in each direction within the detection range, a position of a reflection point closest to the on-board radar apparatus as a boundary candidate position, for a region where no object exists within the detection range, among one or more reflection points detected in the respective frame for the one or more reflected signals;
calculating movement amount data concerning an amount of movement of the on-board radar apparatus;
generating, for every frame in each direction within the detection range, an estimated boundary position from the boundary candidate position detected in a past frame and conversion into a current frame on the basis of the movement amount data;
performing, for every frame in each direction within the detection range, smoothing processing by using the boundary candidate position in the current frame and the estimated boundary position for the current frame to determine a presence or absence of a boundary position with the region where no object exists within the detection range; and
outputting, for every frame in each direction within the detection range, the boundary position to a driving support apparatus in a case where the determined result is the presence of the boundary position.

7. The region detection method according to claim 6, wherein
the performing of the smoothing processing includes:
calculating, for every frame in each direction within the detection range, a likelihood value of the boundary candidate position or the estimated boundary position by using a preset likelihood weight; and
determining, for every frame in each direction within the detection range, that the boundary position is present in a case where the likelihood value is equal to or larger than a predetermined threshold value, and
in the outputting, in a case where the determined result is the presence of the boundary position in each direction within the detection range, for every frame in each direction within the detection range, the boundary position calculated by using a weighted average of distances between the on-board radar apparatus and the boundary candidate position in the current frame or the estimated boundary position, using preset output value weights.

8. The region detection method according to claim 6, wherein
the one or more objects includes two or more objects and the two or more objects include a still object and a moving object.

9. The region detection method according to claim 6, wherein
the one or more objects are one or more still objects.

10. The region detection method according to claim 6, further comprising:
capturing an image of the detection range by using a camera;
setting an image region used for object recognition in the captured image on the basis of the boundary position; and
performing object recognition on the set image region.

* * * * *